(12) United States Patent
Nie et al.

(10) Patent No.: US 11,997,945 B2
(45) Date of Patent: Jun. 4, 2024

(54) HAND PUSH LAWN MOWER WITH A HEIGHT ADJUSTMENT ASSEMBLY

(71) Applicant: Nanjing Chervon Industry Co., Ltd., Nanjing (CN)

(72) Inventors: Fangjie Nie, Nanjing (CN); Toshinari Yamaoka, Nanjing (CN); Haishen Xu, Nanjing (CN); Qingsong Sun, Nanjing (CN); Dezhong Yang, Nanjing (CN); Chao Xian, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 749 days.

(21) Appl. No.: 17/134,670

(22) Filed: Dec. 28, 2020

(65) Prior Publication Data
US 2021/0112711 A1 Apr. 22, 2021

Related U.S. Application Data

(63) Continuation of application No. PCT/CN2019/093796, filed on Jun. 28, 2019.

(51) Int. Cl.
*A01D 34/74* (2006.01)
*A01D 34/69* (2006.01)
(Continued)

(52) U.S. Cl.
CPC .............. *A01D 34/74* (2013.01); *A01D 34/69* (2013.01); *A01D 2034/6843* (2013.01);
(Continued)

(58) Field of Classification Search
CPC ........ A01D 34/74; A01D 34/69; A01D 34/78; A01D 69/02; A01D 2034/6843;
(Continued)

(56) References Cited

U.S. PATENT DOCUMENTS 2,947,132 A * 8/1960 Shaw ................. A01D 34/6806
56/11.1
2,963,842 A * 12/1960 Estes ...................... A01D 75/20
56/320.1

(Continued)

FOREIGN PATENT DOCUMENTS

CN 204616395 U 9/2015
CN 106258180 A 1/2017

(Continued)

OTHER PUBLICATIONS

ISA/CN, Int. Search Report issued on PCT application No. PCT/CN2019/093796, dated Sep. 27, 2019, 3 pages.

*Primary Examiner* — Arpad Fabian-Kovacs
(74) *Attorney, Agent, or Firm* — Greenberg Traurig, LLP

(57) ABSTRACT

A hand push lawn mower includes a body including a cutting blade and an operating device for a user to operate and connected to the body. The body includes a deck, a motor, a height adjustment assembly and a grass baffle. The motor is configured to drive the cutting blade to rotate. The height adjustment assembly is used to adjust the deck to move up and down. The grass baffle is configured to prevent grass clippings from splashing towards the back of the hand push lawn mower. When the height adjustment assembly adjusts the height of the deck, a displacement of the grass baffle in a vertical direction is less than a displacement of the deck in the vertical direction.

17 Claims, 30 Drawing Sheets

(51) Int. Cl.
 *A01D 34/68* (2006.01)
 *A01D 34/78* (2006.01)
 *A01D 69/02* (2006.01)
 *A01D 101/00* (2006.01)

(52) U.S. Cl.
 CPC .............. *A01D 34/78* (2013.01); *A01D 69/02* (2013.01); *A01D 2101/00* (2013.01)

(58) Field of Classification Search
 CPC .... A01D 2101/00; A01D 34/81; A01D 34/68; B25F 5/00
 See application file for complete search history.

(56) References Cited

U.S. PATENT DOCUMENTS

| | | | | |
|---|---|---|---|---|
| 3,190,061 | A * | 6/1965 | Gilbertson | A01D 34/828 56/10.5 |
| 3,432,183 | A * | 3/1969 | Groll | F16P 1/02 56/320.1 |
| 3,799,579 | A * | 3/1974 | Dahl | A01D 34/828 56/17.4 |
| 3,927,513 | A * | 12/1975 | Ramaker | A01D 34/828 56/320.1 |
| 4,030,277 | A * | 6/1977 | Christopherson | A01D 34/828 56/320.1 |
| 4,134,249 | A * | 1/1979 | Wuerker | A01D 34/005 56/320.1 |
| 4,224,785 | A * | 9/1980 | Hoch | A01D 34/74 56/320.1 |
| 5,101,617 | A * | 4/1992 | Hare | A01D 75/20 56/320.1 |
| 5,447,021 | A * | 9/1995 | Plamper | A01D 75/20 56/320.1 |
| 8,522,518 | B2 * | 9/2013 | Hirose | A01D 34/828 56/320.1 |
| 9,241,437 | B2 * | 1/2016 | Bryant | B60K 11/08 |

FOREIGN PATENT DOCUMENTS

| | | | |
|---|---|---|---|
| CN | 206061522 U | 4/2017 | |
| CN | 206110065 U | 4/2017 | |
| CN | 206963358 U | 2/2018 | |
| CN | 107920467 A | 4/2018 | |
| CN | 207505457 U | 6/2018 | |
| FR | 2489651 A3 | 3/1982 | |
| GB | 2328359 A * | 2/1999 | ........... A01D 34/001 |

* cited by examiner

HAND PUSH LAWN MOWER WITH A HEIGHT ADJUSTMENT ASSEMBLY

RELATED APPLICATION INFORMATION

The present application is a continuation of International Application Number PCT/CN2019/093796, filed on Jun. 28, 2019, through which this application also claims the benefit of Chinese Patent Application No. 201810695890.0, filed on Jun. 29, 2018, which applications are incorporated herein by reference in their entirety.

BACKGROUND

This disclosure relates to electric machines, and in particular, to hand push power tools.

Electric machines generally include functional elements configured to achieve different functions, as well as operating devices for a user to control the operation of the electric machines; specifically, the user sends signals to multiple functional elements including a motor through the operating device to control the movement of the functional elements. In related technologies, most hand push power tools, such as hand push lawn mowers and hand push snow blowers, especially DC hand push power tools, use current instead of signals to control functional elements through operating devices like operating switches.

SUMMARY

In one example of the disclosure, a hand push lawn mower includes: a body including a cutting blade; and an operating device for a user to operate and connected to the body. The body includes: a deck; a motor configured to drive the cutting blade to rotate; a height adjustment assembly for adjusting the deck to move up and down; and a grass baffle configured to prevent grass clippings from splashing towards the back of the hand push lawn mower. When the height adjustment assembly adjusts the height of the deck, a displacement of the grass baffle in a vertical direction is less than a displacement of the deck in the vertical direction.

DESCRIPTION

Figure 1:
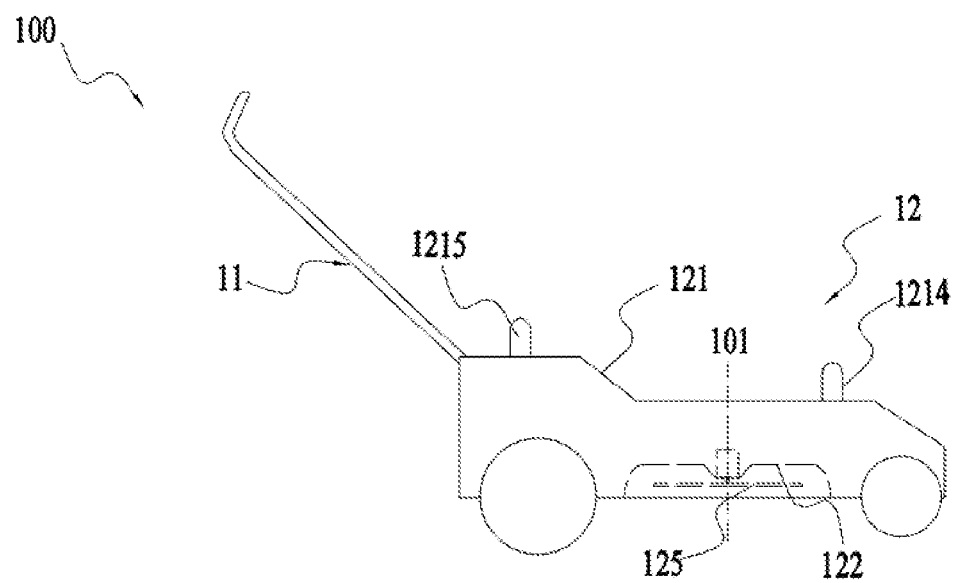
FIG. 1 depicts a schematic diagram of a hand push power tool according to an example.

The electric machine shown in FIG. 1 may be an electric machine that works indoors or outdoors. In this example, as an example, the electric machine is specifically a hand push power tool 100, and the hand push power tool 100 is specifically a hand push lawn mower. A user operates an operating device of the hand push lawn mower to mow grass and vegetation. For the convenience of description, the front, back, up and down directions are specified as shown in FIG. 1. When the hand push power tool 100 travels on the ground, the side where the user stands is the back side, the opposite side is the front side, the side far from the ground is the up side, and the side close to the ground is the down side.

In one example, the electric machine may be other types of hand push power tools, such as hand push snow blowers, all-terrain vehicles, and golf carts, and may also be a hand push power tool that realizes the function of the power tool though outputting power in a predefined form. In fact, as long as the tools include the substantive matter described below in this application, they fall within the scope of protection of this application.

Figure 2:
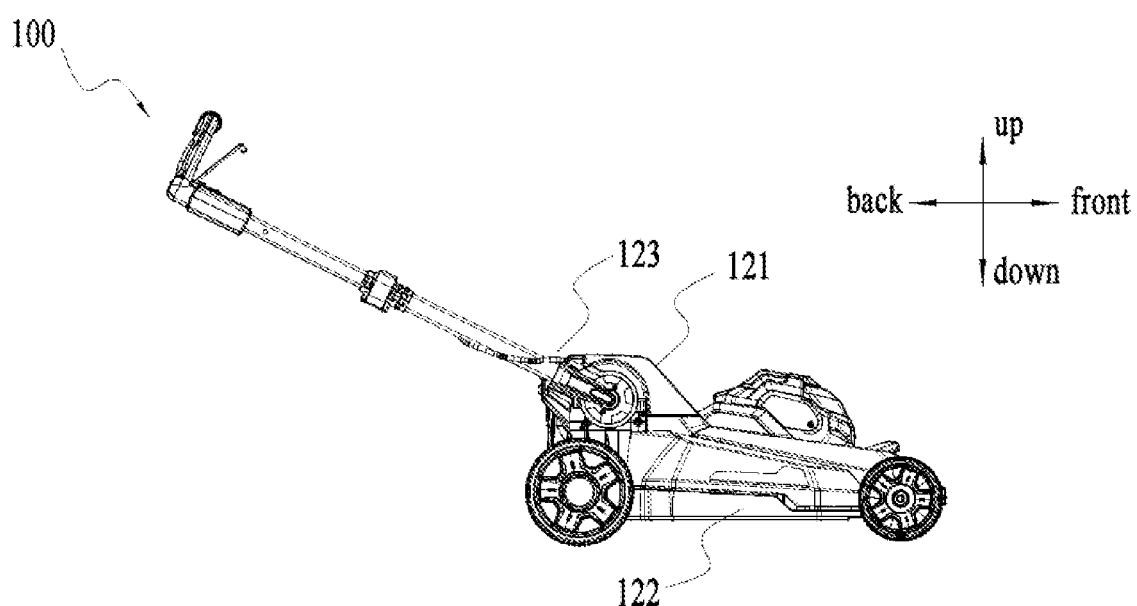
FIG. 2 depicts a plan view of the hand push power tool of FIG. 1.
Figure 3:
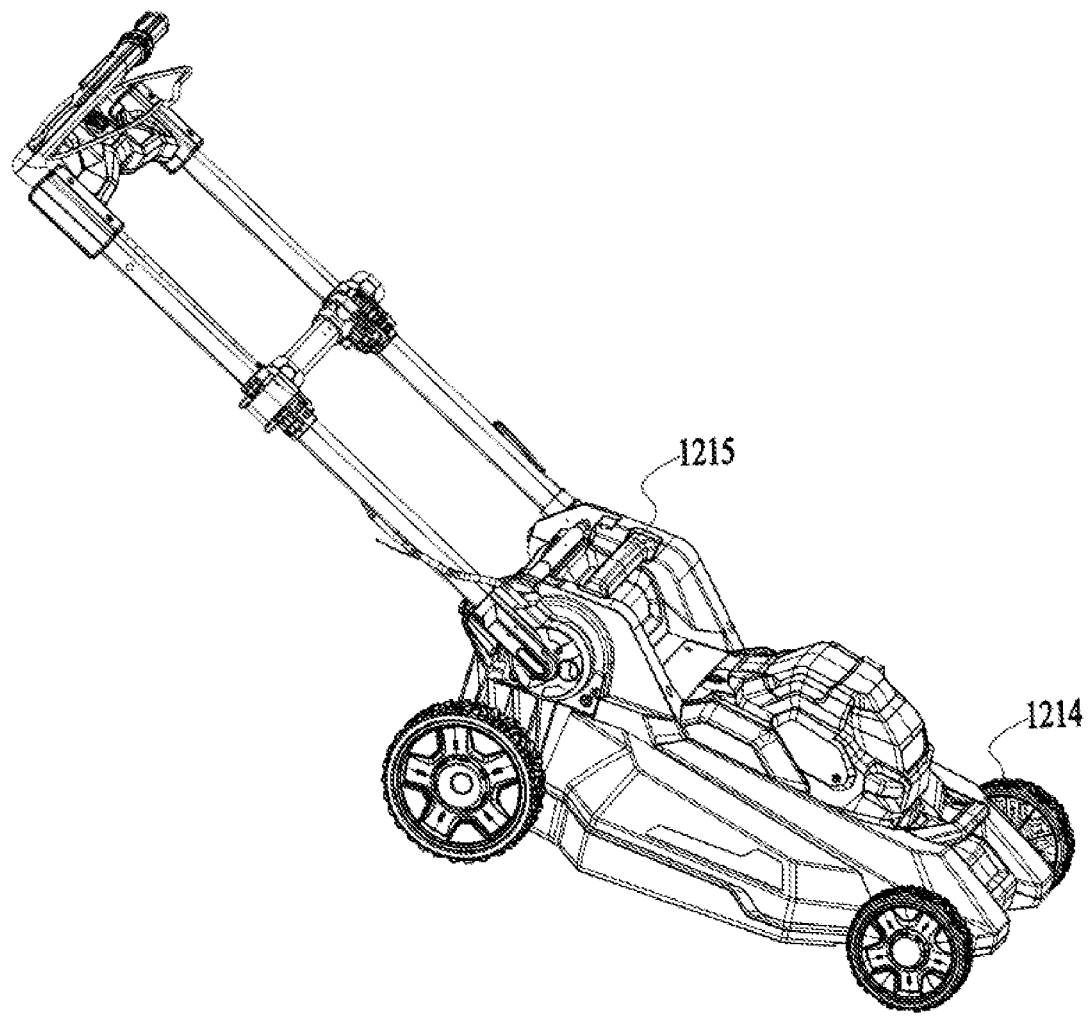
FIG. 3 depicts a perspective view of the hand push power tool in FIG. 2.

As shown in FIGS. 1-3, the hand push power tool 100 includes: an operating device 11 and a body 12. The operating device 11 is grasped by a user to operate the hand push power tool 100. The body 12 includes a body housing 121, a deck 122, and an electrical device 123. The operating device 11 is rotatably connected with the body housing 121. The electrical device 123 includes a plurality of electrical components. The body also includes a work component 125 that realizes the function of the hand push power tool 100. In this example, the work component 125 is specifically a cutting blade.

Figure 4:
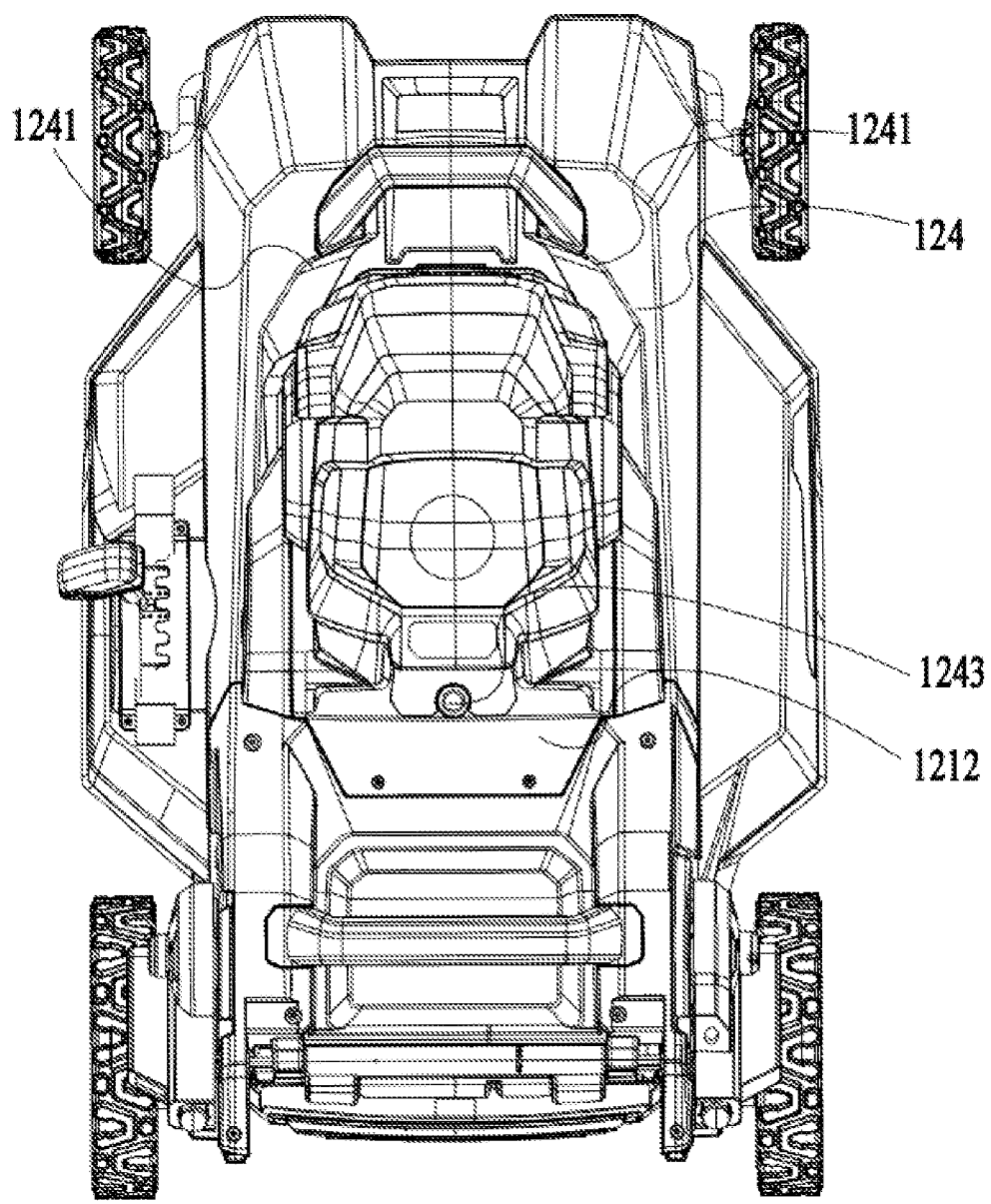
FIG. 4 depicts a top view of a body of the hand push power tool in FIG. 3, with the maintenance compartment in a closed state.
Figure 5:
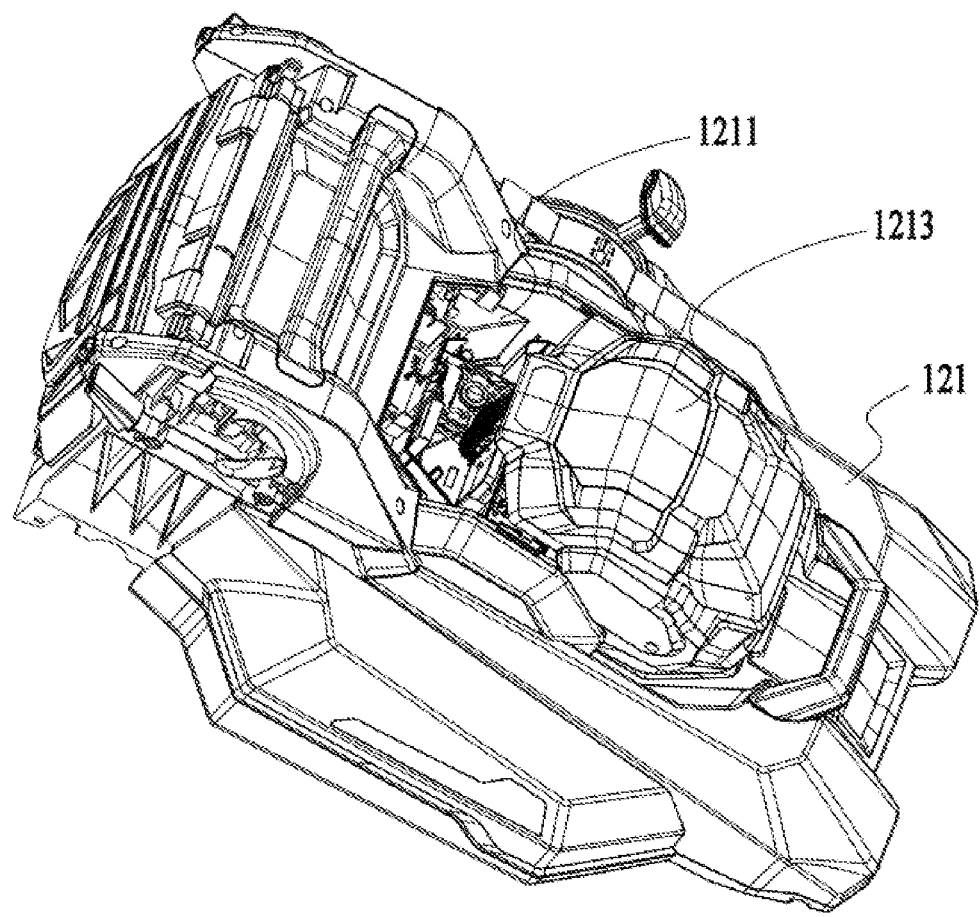
FIG. 5 depicts a perspective view of a part of the structure of the body in FIG. 4, with the maintenance compartment in an open state.
Figure 6:
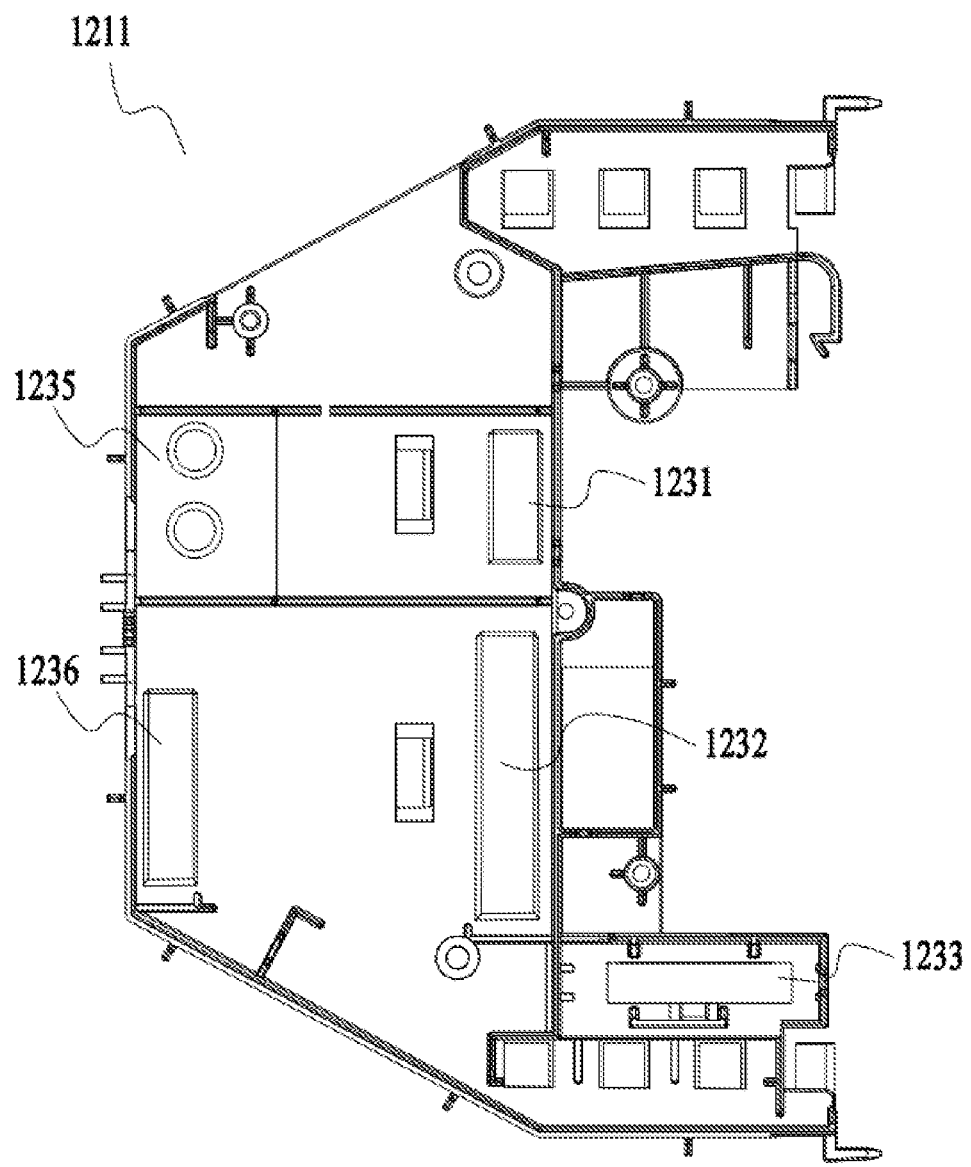
FIG. 6 depicts a plan view of the maintenance compartment in FIG. 5.

As shown in FIGS. 1-7, the body housing 121 is bent to form a maintenance compartment 1211 to accommodate a plurality of electrical components. The maintenance compartment 1211 may be formed by bending the body housing 121 around the plurality of electrical components, or may be formed as an independent compartment body from the body housing 121. In one example, housing components independent from the body housing 121, such as the maintenance compartment 1211 and the maintenance cover 1212 in the body 12 can be regarded as a part of the body housing 121. In this example, as shown in FIGS. 4 and 5, the maintenance compartment 1211 is formed with an opening facing outwards, and the maintenance compartment 1211 is equipped with a maintenance cover 1212. The maintenance cover 1212 and the opening of the maintenance compartment 1211 form a detachable connection. When the maintenance cover 1212 is removed, the opening of the maintenance compartment 1211 is totally open, and when the hand push power tool 100 is placed horizontally on the ground, the maintenance compartment 1211 opens upwards; when the maintenance cover 1212 covers the maintenance compartment 1211, the maintenance compartment 1211 and maintenance cover 1212 is formed with an accommodating cavity, which can be relatively sealed with a sealing structure at the junction of the maintenance cover 1212 and the opening of the maintenance compartment 1211 to prevent moisture and dust from entering the accommodating cavity. In this example, a lip connection structure is used between the maintenance compartment 1211 and the maintenance cover 1212. In one example, a sealing ring or a labyrinth structure may also be adopted for the sealing between the maintenance compartment 1211 and the maintenance cover 1212.

In this example, the maintenance cover 1212 and the body housing 121 are detachably connected by fasteners such as screws. When performing repair and other operations in the internal parts of the maintenance compartment 1211, the screws and the maintenance cover 1212 need to be removed.

Figure 8:
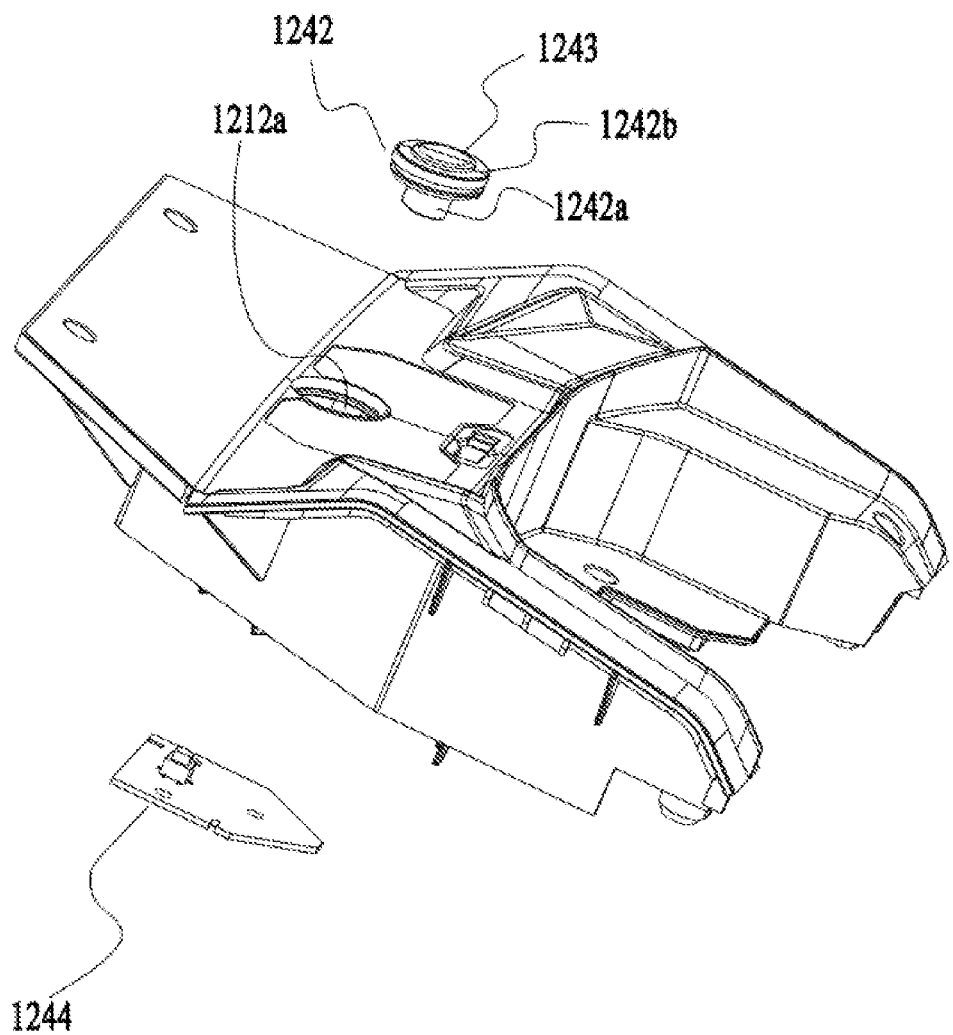
FIG. 8 depicts an exploded view of a part of the structure of the body in FIG. 4.
Figure 9:
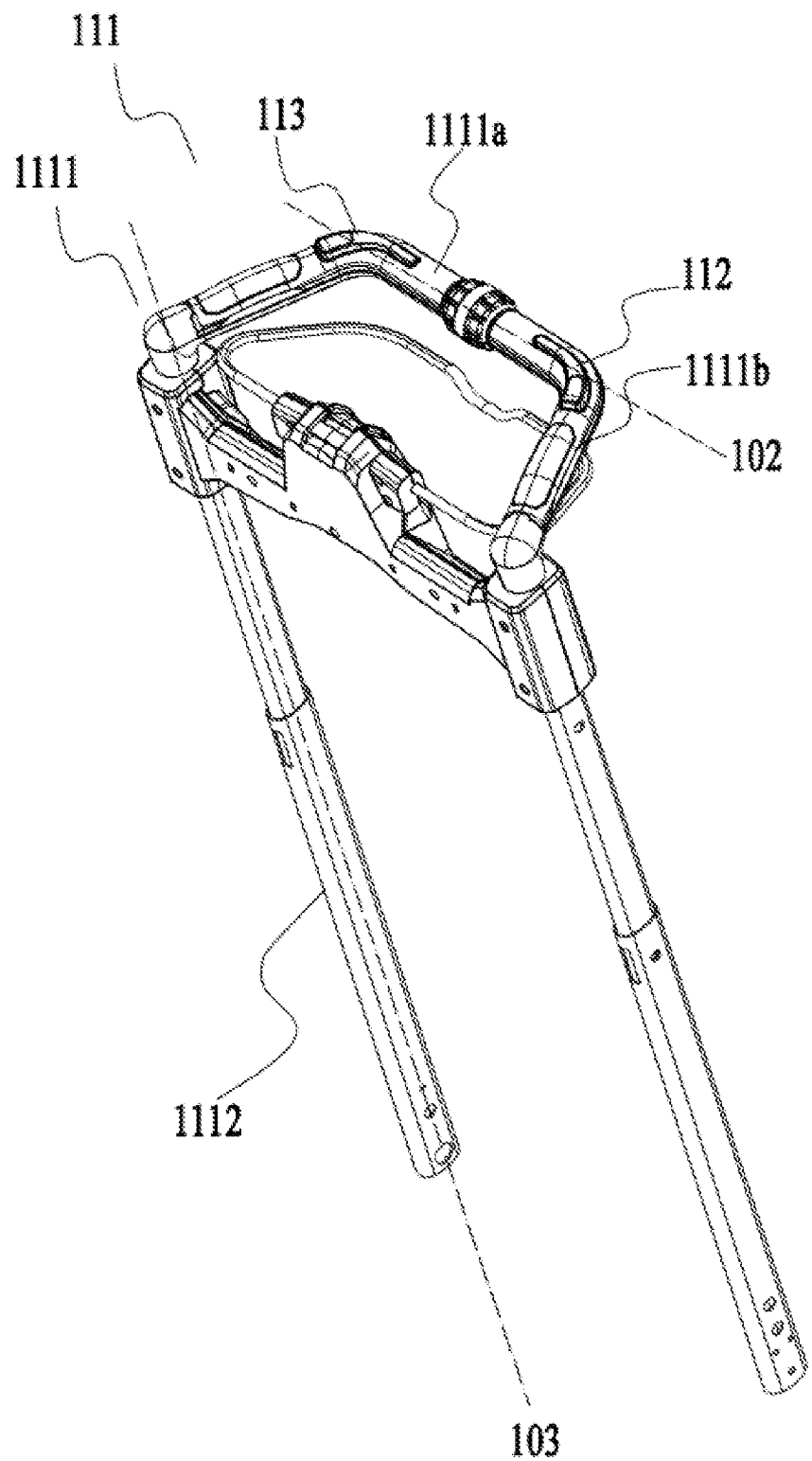
FIG. 9 depicts a perspective view of a part of the structure of the operating device of the hand push power tool in FIG. 2.

In one example, the maintenance cover 1212 and the body housing 121 may also be fixedly connected by other non-threaded fasteners or movably connected by other connecting pieces, e.g., detachably connected by a buckle, slidably connected by a slide rail or chute, or rotatably connected by a hinge. The maintenance cover 1212 can rotate or slide with respect to the body housing 121 to form a plurality of maintenance positions in which the maintenance compartment 1211 is at least partially opened, thereby facilitating maintenance of the hand push power tool 100. As shown in FIG. 8, in this example, the maintenance cover 1212 includes four borders, respectively the front border, the rear border, the left border, and the right border. The distance between the front border and the rear border is about 221 mm, and the distance between the left border and the right border is about 247 mm. A step structure is formed in the vertical direction. The shape and size of the maintenance compartment 1211 are similar to those of the maintenance cover 1212. In one example, the shapes and sizes of the maintenance cover 1212 and the maintenance compartment 1211 are not limited to this. The maintenance cover 1212 and the maintenance compartment 1211 are roughly rectangular, and the maintenance cover 1212 is a plane structure perpendicular to the vertical direction. The vertical direction is a direction perpendicular to a ground when the hand push power tool 100 is on the ground parallel to a horizontal plane.

Figure 16:
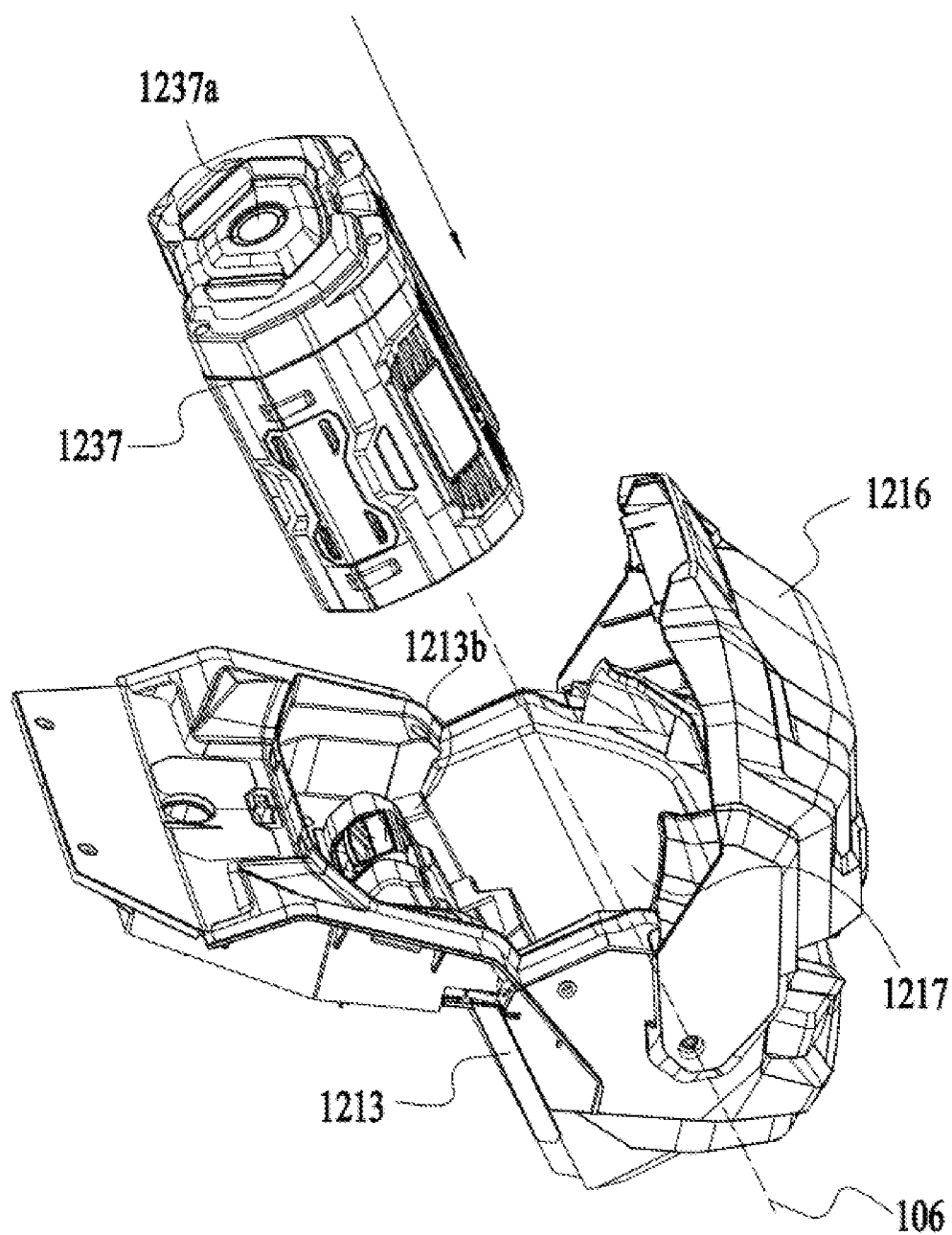
FIG. 16 depicts a perspective view of a part of the structure of the body in FIG. 4, with the battery pack in a removed state.

As shown in FIG. 16, the hand push power tool 100 further includes a battery pack 1237 configured to provide energy, the body housing 121 is further bent around the battery pack 1237 to form a battery pack compartment body 1213. The battery pack 1237 is placed inside the battery pack compartment body 1213. In this example, the maintenance compartment 1212 is arranged between the battery pack compartment body 1213 and the operating device 11. In one example, the maintenance compartment 1212 is arranged on the back side the battery pack compartment body 1213, and on the front side the operating device 11. In other examples, the battery pack compartment body 1213 may also be arranged in other reasonable positions of the body 12.

In this example, the maintenance compartment 1211 includes: a first circuit board 1231 provided with a drive circuit for driving a main motor, a motor that is configured to drive the work component 125 to rotate; a second circuit board 1232 provided with a control circuit for controlling the drive circuit; and a third circuit board 1233 electrically connected with a fuse 1234. In an example, the drive circuit configured to drive the main motor and the control circuit configured to control the drive circuit may be provided on the same circuit board. For example, the first circuit board 1231 is provided with a drive circuit configured to drive the main motor and a control circuit configured to control the drive circuit. In addition, other functional components other than the fuse 1234 and the motor may also be electrically connected to the third circuit board 1233. In this example, the first circuit board 1231, the second circuit board 1232, and the third circuit board 1233 are all arranged in the maintenance compartment 1211. The structure is compact, which saves the internal space of the body and makes normal maintenance more convenient. The maintenance compartment 1211 also houses a fourth circuit board 1235 connected with a capacitor and a fifth circuit board 1236 provided with a drive circuit configured to drive a self-propelled motor, wherein the self-propelled motor is the motor that drives walking wheels of the hand push power tool.

Figure 7:
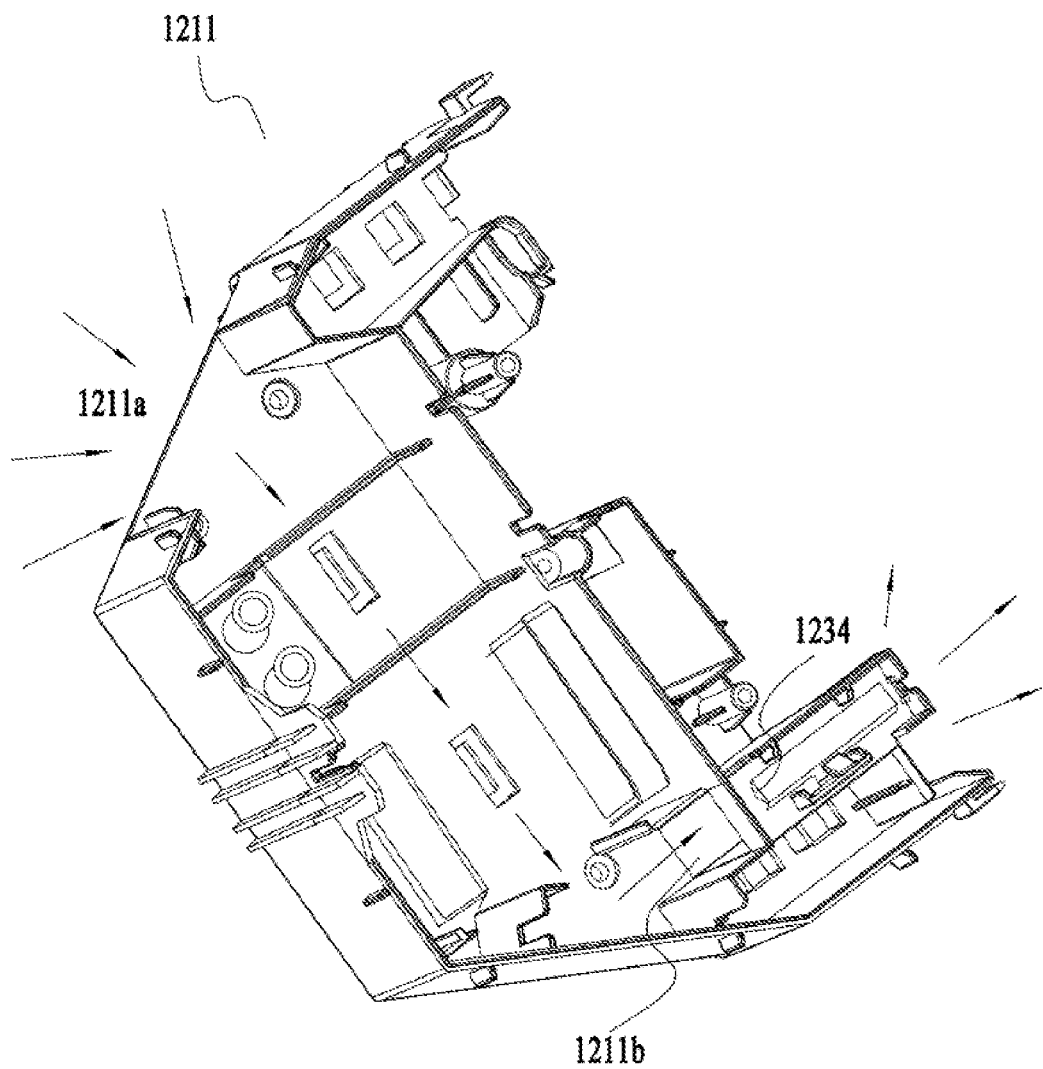
FIG. 7 depicts a perspective view of the maintenance warehouse in FIG. 5.

The wall of the maintenance compartment 1211 is further formed with an air inlet 1211a and an air outlet 1211b;

airflow enters from the air inlet 1211*a*, flows through the inside of the maintenance compartment 1211 and then flows out of the outlet 1211*b* to cool the plurality of electrical components inside the maintenance compartment 1211 and take away dust and other impurities attached to the inside of the maintenance compartment 1211. The airflow forms an air path as shown in FIG. 7 in the maintenance compartment 1211. It can be seen from FIG. 7 that the air path flows through the above-mentioned multiple circuit boards. At the same time, the airflow through the air outlet 1211*b* flows through the fuse 1234 and the third circuit board 1233 connected to the fuse 1234. In this example, the air path of the maintenance compartment 1211 is mainly set up to dissipate heat from the capacitor, the fourth circuit board 1235 connected to the capacitor, the fuse 1234, and the third circuit board 1233 connected to the fuse 1234, while at the same time make full use of the air path to dissipate heat from other electrical components. Therefore, in one example, the design of the direction of the cooling air path varies, and other forms of air path design that can cool the capacitor and the fuse 1234 are also within the protection scope of this application.

As shown in FIGS. 1-7, the deck 122 and the operating device 11 form a rotatable connection. When the user operates the hand push power tool 100, the rotatable connection can be fixed by a locking structure so that the operating device 11 is fixed with respect to the deck 122. The body housing 121 includes a front end and a back end; the back end is connected to the operating device 11; the front end is located at an end of the body housing 121 opposite to the back end. The upper part of the front end of the body housing 121 is detachably connected with a first lifting portion 1214; the upper part of the back end of the body housing 121 is detachably connected with a second lifting portion 1215. The first lifting portion 1214 is away from the operating device 11, and the second lifting portion 1215 is located between the first lifting portion 1214 and the operating device 11. In an example, the position of the second lifting portion 1215 with respect to the operating device 11 is not limited to the above-mentioned position. The user can hold the first lifting portion 1214 with one hand and lift it upwards so that the front end of the hand push power tool 100 is at least partly off the ground, or hold the second lifting part 1215 with one hand and lift it upwards so that the back end of the hand push power tool 100 is at least partly off the ground. If the user respectively holds the first lifting portion 1214 and the second lifting portion 1215 with two hands and lifts them upwards, the entire hand push power tool 100 can be off the ground. In addition, it is also possible to perform operations such as moving and turning over the hand push power tool 100 through the first lifting portion 1214 and the second lifting portion 1215. In this example, the first lifting portion 1214 and the second lifting portion 1215 are graspable structures independent of the body housing 121. The first lifting portion 1214 is detachably connected with the front end of the body housing 121, and the second lifting portion 1215 is detachably connected with the back end of the body housing 121. In other examples, the first lifting portion 1214 and the second lifting portion 1215 may also be rotatably connected to the body housing 121, so that the first lifting portion 1214 and the second lifting portion 1215 rotates about an axis of rotation parallel to the wheel shaft with respect to the body housing 121, so that the user can operate the first lifting portion 1214 and the second lifting portion 1215 more flexibly. In an example, the first lifting portion 1214 and the second lifting portion 1215 may also be formed by the body housing 121, as an integral structure of the body housing 121.

The hand push power tool 100 has a working plane when it is working. As shown in FIG. 1, the work component 125 rotates about an axis of rotation 101 in the working plane, and the first lifting portion 1214 and the second lifting part 1215 are located on the same side of the working plane. With respect to the ground, the work component 125 is located on the lower side of the body housing 121, while the first lifting portion 1214 and the second lifting portion 1215 are located on the upper side of the body housing 121. The orthographic projections of the first lifting portion 1214 and the second lifting portion 1215 in the working plane are both located within the orthographic projection of the body housing 121 in the working plane. When the hand push power tool 100 walk on, i.e., move over or across, the ground, this makes the body housing 121 contact any wall surface perpendicular to the working plane before the first lifting portion 1214 and the second lifting portion 1215.

When the hand push power tool 100 walks along the ground until the front end of the body housing 121 contacts a vertical wall surface, the horizontal distance between the first lifting portion 1214 and the vertical wall surface is greater than 0, which makes the body housing 121 contact the obstacle in the front before the first lifting portion 1214. In order to make the overall structure of the hand push power tool 100 more reasonable and compact, the horizontal distance between the first lifting portion 1214 and the vertical wall is greater than or equal to 99 mm and less than or equal to 131 mm. In this example, the horizontal distance between the first lifting portion 1214 and the vertical wall surface is about 147 mm. In addition, the horizontal distance between the first lifting portion 1214 and the second lifting portion 1215 is greater than or equal to 564 mm and less than or equal to 628 mm. The lower limit of the horizontal distance requires the distance between the first lifting portion 1214 and the second lifting portion 1215 not to be too close to each other, such that when the user lifts the first lifting portion 1214 and the second lifting portion 1215, the hand push power tool 100 can remain relatively stable without a large skew; whereas the upper limit of the horizontal distance requires the distance between the first lifting portion 1214 and the second lifting portion 1215 not to be too far apart from each other, such that he orthographic projection in the working plane should be included in the orthographic projection of the body housing 121 in the working plane to prevent the first lifting portion 1214 and the second lifting part 1215 from hitting the wall and getting damaged, and at the same time prevent the first lifting portion 1214 and the second lifting part 1215 from enlarging the cutting dead angle of the hand push power tool 100. In this example, the horizontal distance between the first lifting portion 1214 and the second lifting portion 1215 is about 608 mm.

In one example, the horizontal distance between the foremost end of the first lifting portion 1214 and the axis of rotation 101 is greater than or equal to 0 and less than or equal to 350 mm, which reduces the restriction on the cutting range of the work component 125 by the first lifting portion 1214 located at the front end of the body housing 121, and to a certain extent prevents the blocking of the work component 125, which leads to a cutting dead angle of the hand push power tool 100. In this example, the horizontal distance between the foremost end of the first lifting portion 1214 and the axis of rotation 101 is about 330 mm.

As shown in FIGS. 1-8, the hand push power tool 100 further includes a lighting device 124. The lighting device 124 includes a lighting assembly 1241 configured to emit light, a lighting switch 1242 configured to turn on or off the lighting assembly 1241, a lighting indicator assembly 1243 configured to indicate whether the lighting assembly 1241 is emitting light, and a lighting circuit board 1244 configured to control the lighting assembly 1241 and the lighting indicating assembly 1243. In this example, the lighting assembly 1241 is installed on the left and right sides of the body housing 121 near the battery pack compartment body 1213 in the forward direction of the hand push power tool 100. When the lighting switch 1242 is triggered, the lighting assembly 1241 emits light towards the front side of the hand push power tool 100 in the forward direction. The lighting indicator assembly 1243 is located between the lighting assembly 1241 and the operating device 11, and is also located between the battery pack compartment body 1213 and the operating device 11. The lighting indicator assembly 1243 can be arranged at any reasonable position in the visible area that can be observed when the user is at the back side of the hand push power tool 100 to operate the operating device 11.

In this example, as shown in FIG. 8, a light base 1242a is also formed on the lighting switch 1242, and the lighting indicator assembly 1243 is mounted on the light base 1242a and forms a fixed connection with the light base 1242a. The lighting switch 1242 is mounted on the maintenance cover 1212. The maintenance cover 1212 is formed with a throughhole 1212a for the lighting switch 1242 and the lighting indicator assembly 1243 to be partially exposed. The different colors presented by the lighting indicator assembly 1243 can be used to distinguish whether the lighting assembly 1241 is in a luminous state. The lighting switch 1242 and the throughhole 1212a form an interference fit. In one example, the lighting indicator assembly 1243 can also be connected to the maintenance cover 1212 in other connection forms.

The lighting circuit board 1244 configured to control the lighting assembly 1241 and the lighting indicator assembly 1243 is located inside the maintenance compartment 1211, and both the lighting assembly 1241 and the lighting indicator assembly 1243 are electrically connected to the lighting circuit board 1244. The lighting switch 1242 also includes an elastic portion 1242b. The elastic portion 1242b and the throughhole 1212a form an interference fit. When the lighting switch 1242 is pressed down, the elastic portion 1242b is elastically deformed such that the lighting switch 1242 is displaced downward, triggering the related electrical components on the lighting circuit board 1244, which causes the lighting assembly 1241 to be lit.

The lighting device 124 in this example can also be applied to other tools, such as snow blowers, all-terrain vehicles, golf carts, trucks and the like. The structure and position arrangement of the lighting device can refer to the lighting device 124 in this example, and will not be repeated here.

As shown in FIGS. 1-10, the operating device 11 of the hand push power tool 100 is connected to the body 12 for the user to operate the hand push power tool 100. The operating device 11 includes a handle 111 for the user to push the hand push power tool 100 to walk on the ground. The handle 111 includes a grip portion 1111 for the user to hold. The grip portion 1111 includes a first grip portion 1111a and a second grip portion 1111b; the first grip portion 1111a extends along the direction of a first straight line 102. In this example, the first grip portion 1111a and the second grip portion 1111b form a one-piece structure. In one example, the grip portion 1111 may also be formed by connecting the independent first grip portion 1111a and the independent second grip portion 1111b. The handle 111 further includes a connecting rod 1112 connecting the grip portion 1111 and the body 12. In this example, the connecting rod 1112 extends along a second straight line 103 that is perpendicular to the first straight line 102.

The operating device 11 also includes a first switch 112 and a second switch 113 that control and drive the start and stop of a self-propelled motor to make the walking wheels of the hand push power tool 100 walk. The first switch 112 and the second switch 113 are both mounted to the handle 111, and more specifically, the first switch 112 and the second switch 113 are both mounted to the grip portion 1111.

The operating device 11 also includes a fifth circuit board 1236 provided with a drive circuit for driving the self-propelled motor. The first switch 112 and the second switch 113 are both electrically connected to the fifth circuit board 1236. Only when the first switch 112 and the second switch 113 are both triggered, can the drive circuit on the fifth circuit board 1236 control the self-propelled motor to start, and can the hand push power tool 100 walk on the ground. If the first switch 112 or the second switch 113 is accidentally triggered under a non-working condition, the self-propelled motor will not start, ensuring operational safety. After the self-propelled motor is started, if one of the first switch 112 and the second switch 113 is released and is no longer in the triggered state, the control circuit will control the self-propelled motor to remain in the started state instead of stop. Only when both the first switch 112 and the second switch 113 are released and are no longer in the triggered state, will the self-propelled motor stop. In one example, the operating device 11 may also include a first switch 112 for controlling the start and stop of the self-propelled motor. The first switch 112 is electrically connected to the fifth circuit board 1236 provided with a drive circuit for driving the self-propelled motor. Only when the first switch 112 is triggered more than twice, will the drive circuit control the self-propelled motor to start. This also avoids accidental triggering of the self-propelled motor and ensures operational safety.

In this example, the first switch 112 and the second switch 113 are mounted on the grip portion 1111, and the grip portion 1111 is formed with grooves or holes for installing the first switch 112 and the second switch 113; the first switch 112 and the second switch 113 are partially embedded in the grooves or holes to form a fixed connection with the grip portion 1111. In one example, the first switch 112 and the second switch 113 can also be connected to the surface of the grip portion 1111. In addition, the first switch 112 and the second switch 113 are arranged at the junction of the first grip portion 1111a and the second grip portion 1111b, i.e., the most convenient part for the user to grip during operation. In other examples, the first switch 112 and the second switch 113 can also be arranged in other positions of the operating device 11. The structure of the handle 111 is not limited to the structure in this example. The specific positions of the first switch 112 and the second switch 113 can also be based on the specific structure and setting of the handle 111. In an example, the arrangements of the first switch 112 and the second switch 113 may not even be limited to the operating device 11. One of the switches may be provided on the body 12, and the self-propelled motor will start when both switches are triggered, and stop when both switches are released.

Figure 10:
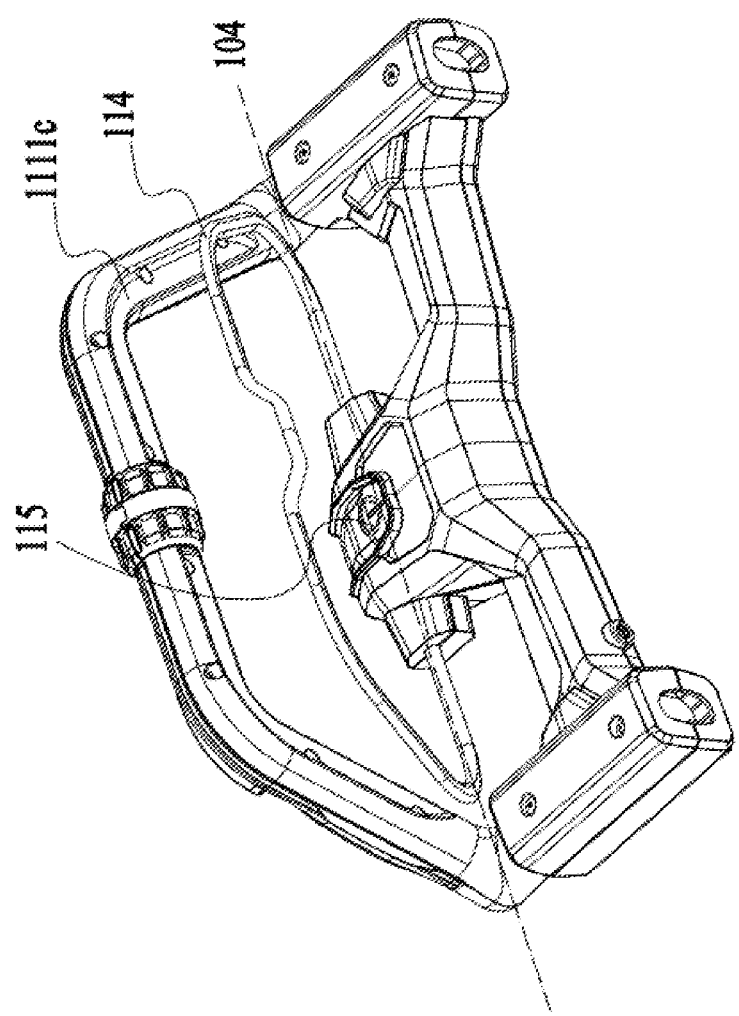
FIG. 10 depicts a perspective view of a part of the structure of the operating device of the hand push power tool in FIG. 2.

As shown in FIG. 10, the operating device 11 further includes a triggering device 114 and a power switch 115. The triggering device 114 and the operating device 11 form a rotatable connection, and can rotate with respect to the handle 111 about the third straight line 104. Both the triggering device 114 and the power switch 115 are electrically connected to the second circuit board 1232, and the second circuit board 1232 is provided with a control circuit for controlling the drive circuit. When the power switch 115 is triggered and the triggering device 114 is flipped to the start position, the control circuit controls the work component 125 to start rotating. Keep the power switch 115 triggered and the triggering device 114 flipped to the start position to keep the work component 125 rotating. Generally speaking, the triggering device 114 may be attached to the handle 111 in the start position, so that the user can hold the handle to operate the hand push power tool 100 while keeping the triggering device 114 in the start position. In this example, the grip portion 1111 is formed with an inwardly recessed groove 1111c. When the triggering device 114 is flipped to the start position, the triggering device 114 is accommodated in the groove 1111c, which restricts the position of the triggering device 114 with respect to the grip portion 1111, making it more convenient and labour-saving for the user to hold the triggering device 114 and the grip portion 1111.

Figure 11:
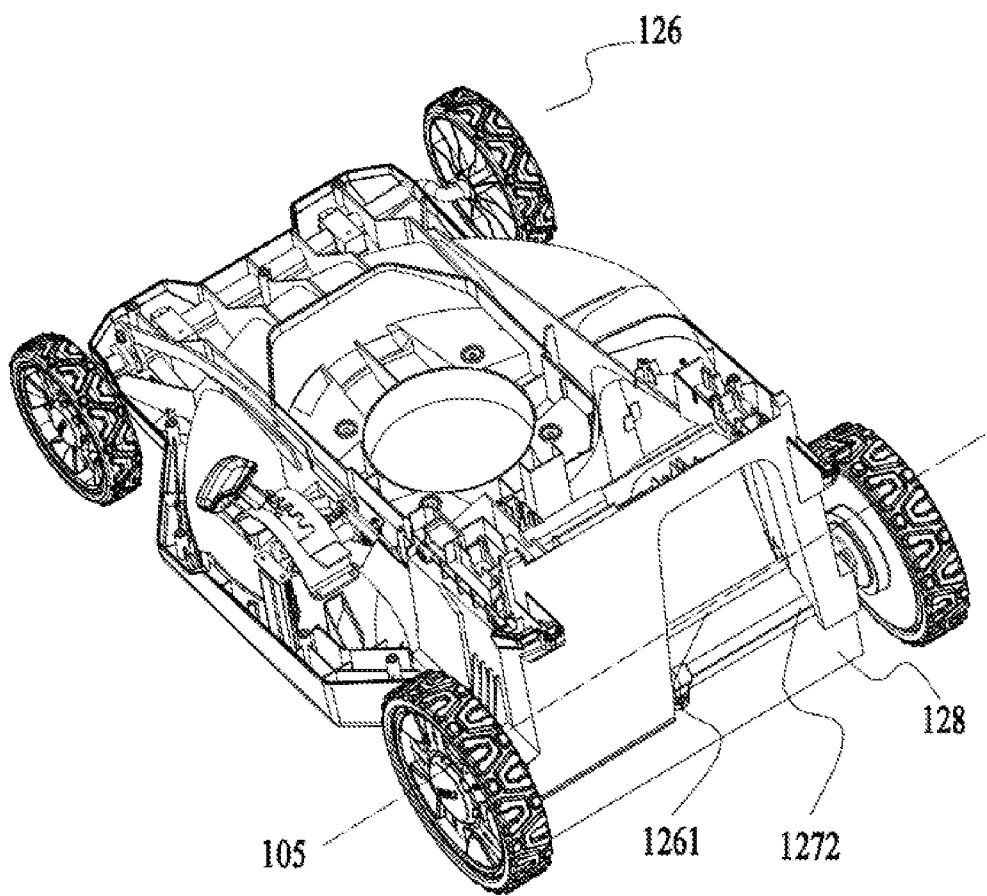
FIG. 11 depicts a perspective view of a part of the structure of the body in FIG. 4.
Figure 12:
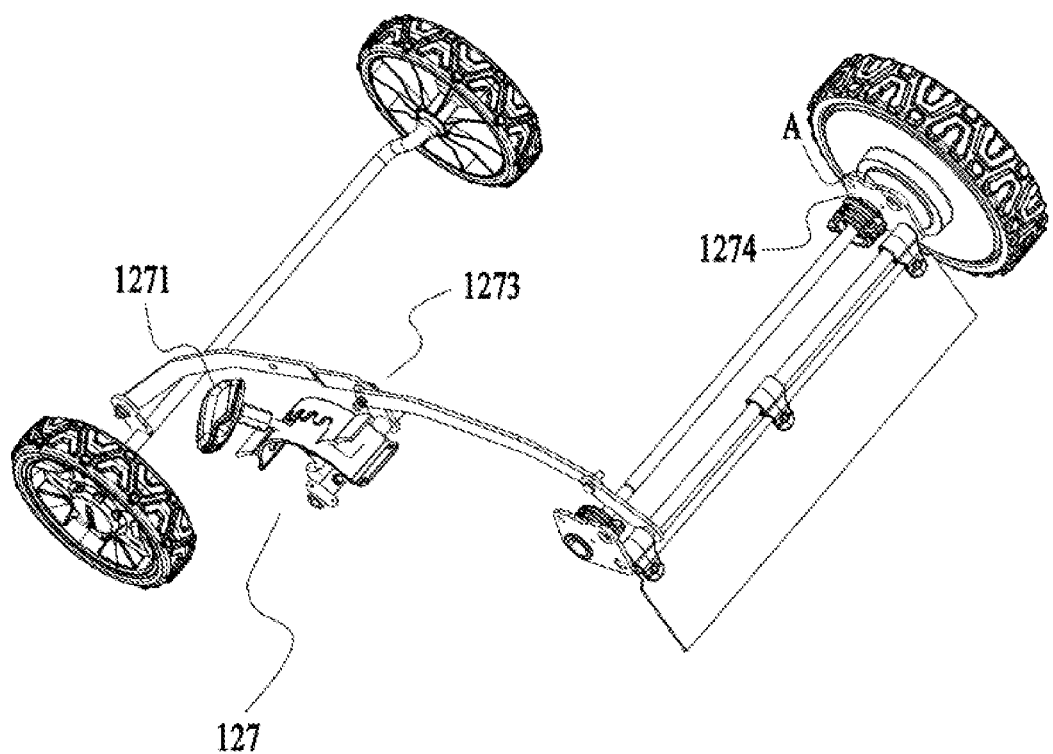
FIG. 12 depicts a perspective view of a part of the structure of the body in FIG. 4.
Figure 13:
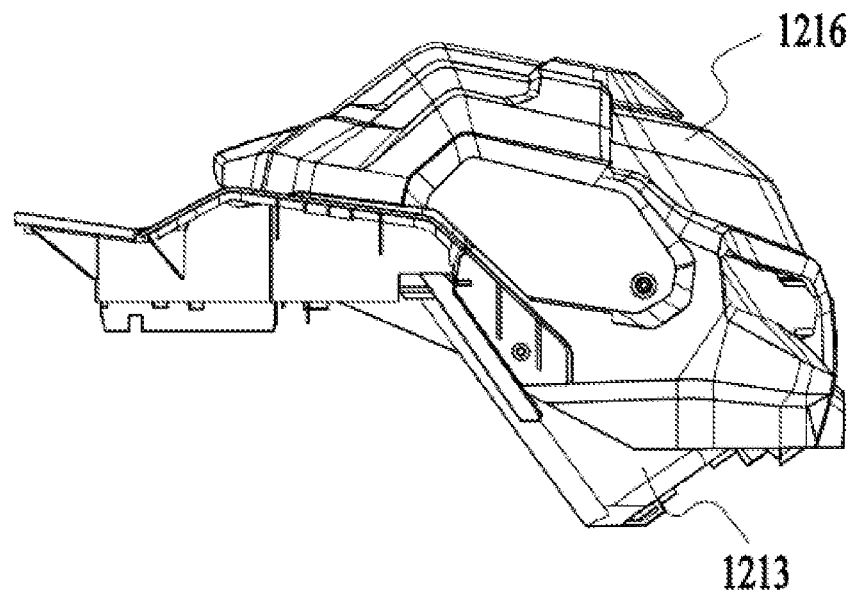
FIG. 13 depicts a plan view of a part of the structure of the body in FIG. 4, with the cover in a closed state.

As shown in FIGS. 1-12, the hand push power tool 100 includes a walking assembly 126 that realizes the self-propelling of the hand push power tool 100. As shown in FIG. 11, the walking assembly 126 includes a first driving shaft 1261 that drives the walking wheels to rotate about a fourth straight line 105. The hand push power tool 100 also includes a height adjustment assembly 127 that adjusts the deck 122 so that the deck 122 can move up and down. As shown in FIGS. 11 and 12, the height adjustment assembly 127 includes an adjustment handle 1271 that receives adjustment force, a second drive shaft 1272 that drives the deck 122 to move, and a link mechanism 1273 that connects the adjustment handle 1271 and the second drive shaft 1272. The first drive shaft 1261, the second drive shaft 1272 and the fourth straight line 105 were parallel to each other. The second drive shaft 1272 is eccentrically arranged with respect to the fourth straight line 105 and the first drive shaft 1261. When the hand push power tool 100 is in different working conditions, it is necessary to adjust the height of the deck 122 from the ground based on the actual conditions. The user applies a driving force by operating the adjustment handle 1271, which drives the link mechanism 1273 to rotate, thereby driving the second drive shaft 1272 and the deck 122 to rotate to adjust the height of the deck 122.

As shown in FIG. 11, the body 12 also includes a grass baffle 128, which is generally located at the back of the hand push power tool 100 when the user operates the hand push power tool 100. The grass baffle 128 is configured to prevent grass clippings from splashing towards the back of the hand push power tool 100. Generally speaking, the grass baffle 128 can be mounted to the deck 122 or the body housing 121. However, when the height of the deck 122 is adjusted, the grass baffle 128 also moves up and down with the deck 122 or the body housing 121, and wears and tears with the ground and other contact bodies over time, which affects the performance and service life of the grass baffle 128.

In this example, the height adjustment assembly 127 also includes a connecting piece 1274 that is rotatably connected to the walking wheels at the center A of the walking wheel. The connecting piece 1274 forms a rotatable connection with the first drive shaft 1261 and a fixed connection with the second drive shaft 1272. In this example, the connecting piece 1274 and the second drive shaft 1272 are welded together as a one-piece structure. The grass baffle 128 is mounted to the second drive shaft 1272. The first drive shaft 1261 supports the deck 122, and the deck 122 is rotatably connected to the first drive shaft 1261. By setting a reasonable distance from the first drive shaft 1261 to the center A of the walking wheel, from the second drive shaft 1272 to the center A of the walking wheel, and the ratio of the distance from the first drive shaft 1261 to the center A of the walking wheels to the distance from the second drive shaft 1272 to the center A of the walking wheel, when the height adjustment assembly 127 adjusts the height of the deck 122, the second drive shaft 1272 drives the connecting piece 1274 to rotate around the center A of the walking wheel, and the connecting piece 1274 drives the deck 122 to rotate around the center A of the walking wheel, the displacement of the grass baffle 128 in the vertical direction is less than half of the displacement of the deck 122 in the vertical direction. In this example, the ratio of the distance from the first drive shaft 1261 to the center A of the walking wheels to the distance of the second drive shaft 1272 to the center A of the walking wheels is about 1.52, so that when the height adjustment assembly 127 adjusts the height of the deck 122, the displacement of the grass baffle 128 in the vertical direction is much smaller than the displacement of the deck 122 in the vertical direction.

In one example, the grass baffle 128 can also be connected to the first drive shaft 1261 or other positions, but when the height adjustment component 127 adjusts the height of the deck 122, the position of the center A of the walking wheels remains unchanged, and the connection position of the grass baffle 128 is closer to the position of the center A of the walking wheel, that is, the position where the grass baffle 128 is connected to the body 12 and the position of the center A of the walking wheels can be infinitely close or even overlapped, so that the position of the grass baffle 128 remains substantially unchanged in the vertical direction, i.e., the change, if any, is less than a few mm.

Figure 17:
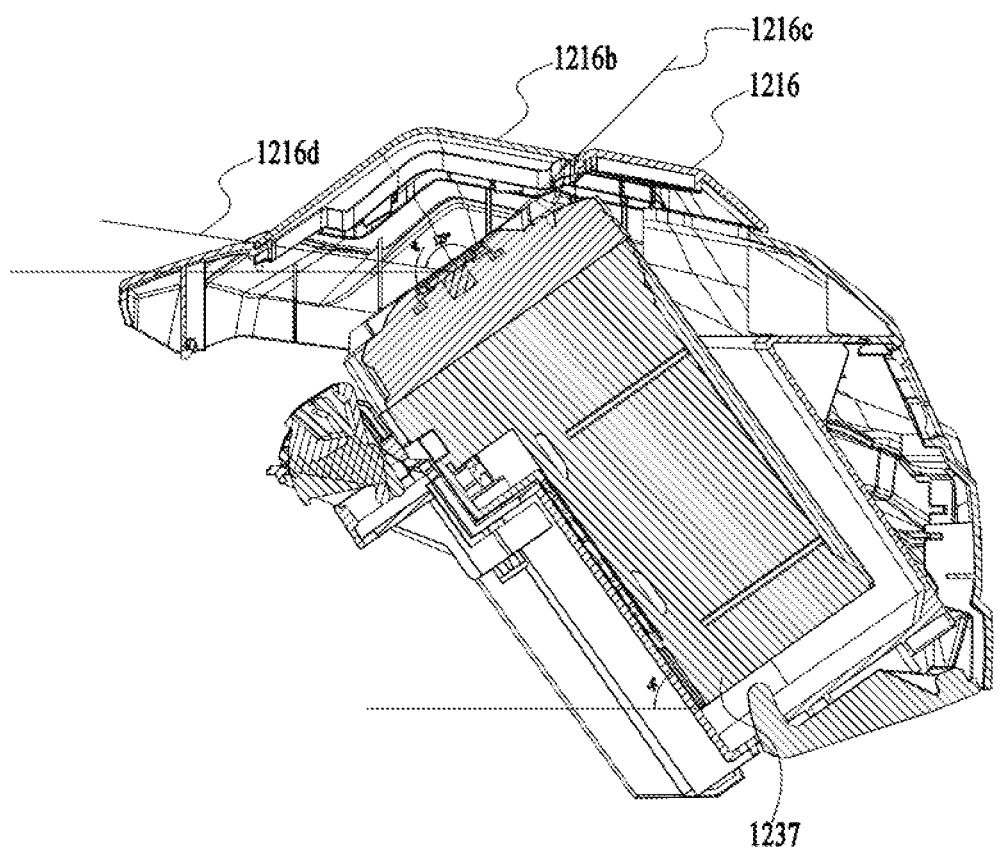
FIG. 17 depicts a sectional view of a part of the structure of the body in FIG. 4, with the battery pack mounted inside the battery pack compartment.

As shown in FIGS. 1-17, the body 12 also includes a battery pack configured to provide energy source for the self-propelled motor and the main motor. In this example, as shown in FIG. 17, the battery pack is battery pack 1237. The body housing 121 includes a battery pack compartment body 1213, which is an independent housing connected to the body housing 121. In an example, the battery pack compartment body 1213 may also be integrally formed by the body housing 121. The body 12 further includes a battery pack compartment cover 1216. The battery pack compartment cover 1216 and the battery pack compartment body 1213 form a rotatable connection about a fifth straight line 106. The battery pack compartment body 1213 is open through a window 1217 connecting the inside and the outside, and the battery pack compartment cover 1216 has an open state and a closed state with respect to the window 1217. When the battery pack compartment cover 1216 is in an open state with respect to the window 1217, the window 1217 connects the inside and outside of the battery pack compartment body 1213, and the battery pack can be taken out from the battery pack compartment body 1213, that is, the battery pack 1237 and the battery pack compartment body 1213 form a detachable connection; when the battery pack compartment cover 1216 is in a closed state with respect to the window 1217, the battery pack compartment body 1213 and the battery pack compartment cover 1216 form a substantially closed accommodating space, namely the battery pack compartment body 1213, and the battery pack 1237 is accommodated inside the battery pack compartment body 1213.

Figure 14:
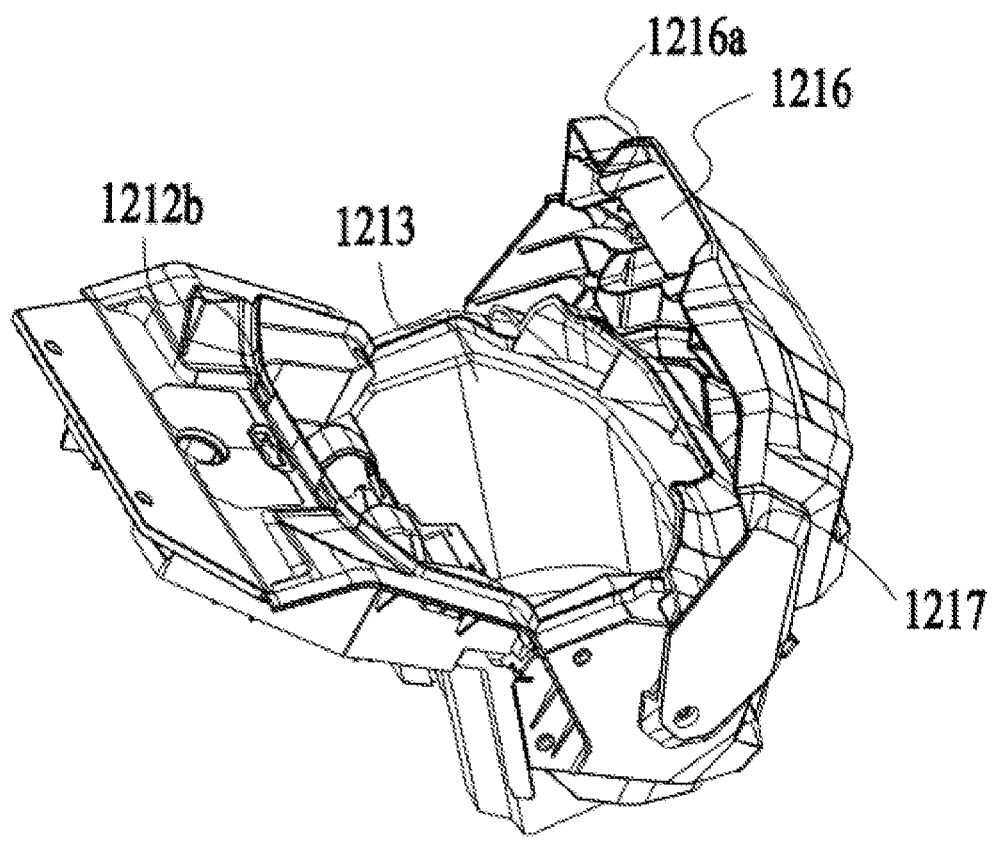
FIG. 14 depicts a plan view of part of the structure of the body in FIG. 4, with the cover in an open state.

In this example, as shown in FIGS. 4 and 7, the maintenance cover 1212 is also formed with a slot 1212b. As shown in FIG. 14, the battery pack compartment cover 1216 is formed with a hook 1216a. When the battery pack compartment cover 1216 is in a closed state with respect to the window 1217, the hook 1216a is locked into the slot 1212b and forms a limit structure with the slot 1212b so that the battery pack compartment cover 1216 does not rotate with respect to the battery pack compartment body 1213. In other examples, the position of the hook 1216a and the slot 1212b is flexible, the maintenance cover 1212 can be formed with the hook 1216a, and the battery pack compartment cover 1216 can be formed with the slot 1212b; or the battery pack compartment cover 1216 can be formed with the hook 1216a, and the battery pack compartment body 1213 can be formed with the slot 1212b. In addition, the limit structure configured to limit the battery pack compartment cover 1216 and keep the battery pack compartment cover 1216 in a closed state with respect to the battery pack compartment body 1213 is not limited to the engaging structure of the hook 1216 and the slot 1212b; other detachable limit structures, such as magnet or lock, will also work.

Figure 15:
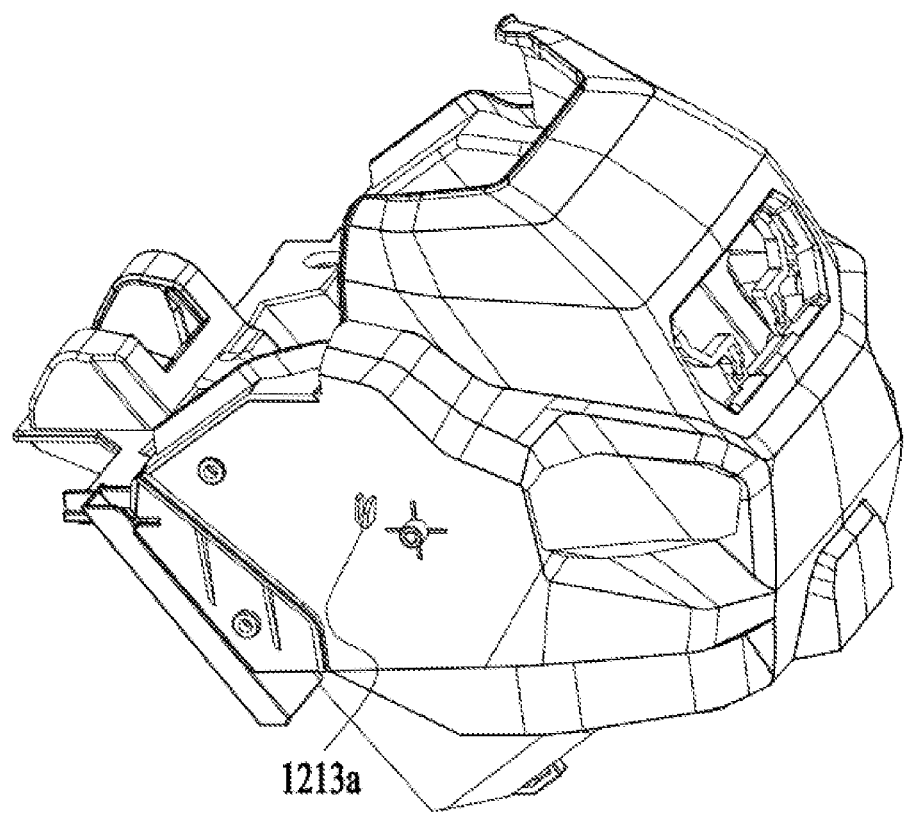
FIG. 15 depicts a perspective view of a battery pack compartment of the body in FIG. 14.

As shown in FIGS. 14 and 15, a supporting portion 1213a is also formed on the outer surface of the battery pack compartment body 1213 close to the junction of the battery pack compartment body 1213 and the battery pack compartment cover 1216 to support the battery pack compartment cover 1216 and keep the battery pack compartment cover 1216 in an open state with respect to the battery pack compartment body 1213. The supporting portion 1213 actually limits the rotatable angle of the battery pack compartment cover 1216 with respect to the battery pack compartment body 1213, so that the battery pack compartment cover 1216 cannot rotate over a predefined angle. In this example, the rotatable angle range of the battery pack compartment cover 1216 with respect to the battery pack compartment body 1213 is about 0 to 65°. That is to say, when the battery pack compartment cover 1216 is supported by the supporting portion 1213a, in the open state, the angle formed between the battery pack compartment cover 1216 and the battery pack compartment body 1213 is approximately 65°. In one example, the rotatable angle of the battery pack compartment cover 1216 with respect to the battery pack compartment body 1213 may be larger than 0° and less than 180°. Based on the angle of the battery pack compartment body 1213 with respect to the deck 122 and the structure of the body housing 121 etc., other reasonable ranges between 0 and 180° may also be set as the rotatable angle range of the battery pack compartment cover 1216 with respect to the battery pack compartment body 1213.

In this example, when the battery pack compartment cover 1216 is in an open state with respect to the battery pack compartment body 1213, pressing the handle 111 down can lift up the end of the body 12 away from the handle 111, so that the center of gravity of the battery pack compartment cover 1216 shifts; under gravity force, the battery pack compartment cover 1216 rotates from the open state to the closed state, and at the same time the hook 1216a snaps into the slot 1212b, thus eliminating the need to manually operate the battery pack compartment cover 1216 to make the battery pack compartment cover 1216 rotate from the open state to the closed state and press down the battery pack compartment cover 1216 to make the hook 1216a snap into the slot 1212b. In addition, in this example, since the first lifting portion 1214 is disposed at the front end of the battery pack compartment body 1213 with respect to the body housing 121, when the battery pack compartment cover 1216 is in an open state with respect to the battery pack compartment body 1213, lifting the first lifting portion 1214 can also lift up the end of the body 12 away from the handle 111, so that under gravity force, the battery pack compartment cover 1216 restores from the open state to the closed state, and at the same time, the hook 1216a snaps into the card slot 1212b.

As shown in FIGS. 1-17, the battery pack compartment body 1213 of the body housing 121 includes a body part surrounding a groove. The groove is recessed toward the inside of the body housing 121. The groove may be integrally moulded with the body housing 121, or may be an independent structure connected to the body housing 121. The battery pack compartment body 1213 is formed with an insertion port for the battery pack 1237 to be inserted. In this example, the insertion port is the window 1217.

The battery pack compartment body 1213 and the battery pack compartment cover 1216 are bent in a direction surrounding the battery pack 1237 to form a battery pack compartment for accommodating the battery pack 1237.

As shown in FIG. 16, the inside of the battery pack compartment is also formed with a coupling portion 1213b that guides the battery pack 1237 to be coupled to the body housing 121 along a direction of insertion. The coupling portion 1213b can be integrally formed with the body housing 121 or can be an independent structure connected to the battery pack compartment body 1213 or the battery pack compartment cover 1216. In this example, the coupling portion 1213b is a sliding rail integrally formed with the battery pack compartment body 1213. When installing the battery pack 1237 into the battery pack compartment body 1213, slide it all the way along the sliding rail to the bottom of the battery pack compartment body 1213. Of course, the coupling portion 1213b could also be any other structure with a displacement guiding function.

The body 12 may further include a fixing portion configured to fix the battery pack 1237 in a predefined position in the battery pack compartment. After the battery pack 1237 is inserted into the bottom of the battery pack compartment body 1213, operate the battery pack 1237 or the fixing portion to form a detachable connection between the battery pack 1237 and the fixing portion. The fixing portion may be integrally formed or mounted to a buckle or a magnetic component of the battery pack 1237 or the body housing 121, which is not limited herein.

In this example, the battery pack 1237 is inserted into the battery pack compartment body 1213 from the insertion port along the sliding rail along the direction shown in FIG. 16. In this example, the battery pack compartment body 1213 is inclined at a predefined angle with respect to the horizontal plane, specifically, inclined backward from the vertical direction, so the battery pack 1237 is also inserted into the battery pack compartment body 1213 at a predefined angle with respect to the horizontal plane. The angle between the direction of insertion of the battery pack 1237 and the horizontal plane is greater than or equal to 30° and less than or equal to 80°. In one example, the angle between the direction of insertion of the battery pack 1237 and the horizontal plane is 54°, that is, the inclination angle of the battery pack compartment body 1213 and the sliding rail with respect to the horizontal plane is also 54°. In other examples, the angle may also be other values in the above range.

The battery pack 1237 is also formed with a power indicator light 1237a configured to display power. When the battery pack 1237 is mounted to the coupling portion 1213b, the power indicator light 1237a emits light along the direction of insertion. The power indicator light 1237*a* can be arranged at any position on the battery pack 1237, and mostly on the top surface of the battery pack 1237 to facilitate visualization. In this example, the power indicator light 1237*a* is arranged at the center of the top surface of the battery pack 1237. The battery pack compartment cover 1216 is also formed with a visible portion 1216*b* for the user to observe the display of the power indicator light 1237*a* located in the battery pack compartment. The visible portion 1216*b* is a transparent portion made of at least partially transparent material. In this example, the visible portion 1216*b* is made of translucent polished plastic. In one example, the visible portion 1216*b* may also be made of other translucent materials, such as glass. The visible portion 1216*b* is installed to the battery pack compartment cover 1216 and can be integrally formed with the battery pack compartment cover 1216 when the entire battery pack compartment cover 1216 is a transparent part, or can be an independent structure and forms a fixed connection with the battery pack compartment cover 1216. In this example, the visible portion 1216*b* is a plastic shell with a smaller coverage area than the battery pack compartment cover 1216 and a different material from the battery pack compartment cover 1216. The visible portion 1216*b* allows the user to observe the power indicator light 1237*a* from the outside of the battery pack compartment, and at the same time restricts the visual range due to its own area limitation.

In order to ensure the stability of the machine, the battery pack 1237 is generally installed near the center of the body housing 121 in the left-right direction, that is, the battery pack 1237, the battery pack compartment body 1213 and the power indicator light 1237*a* are generally symmetrical about the midsagittal plane of the operating device 11. The triggering device 114 is also symmetrical about the midsagittal plane.

Figure 18:
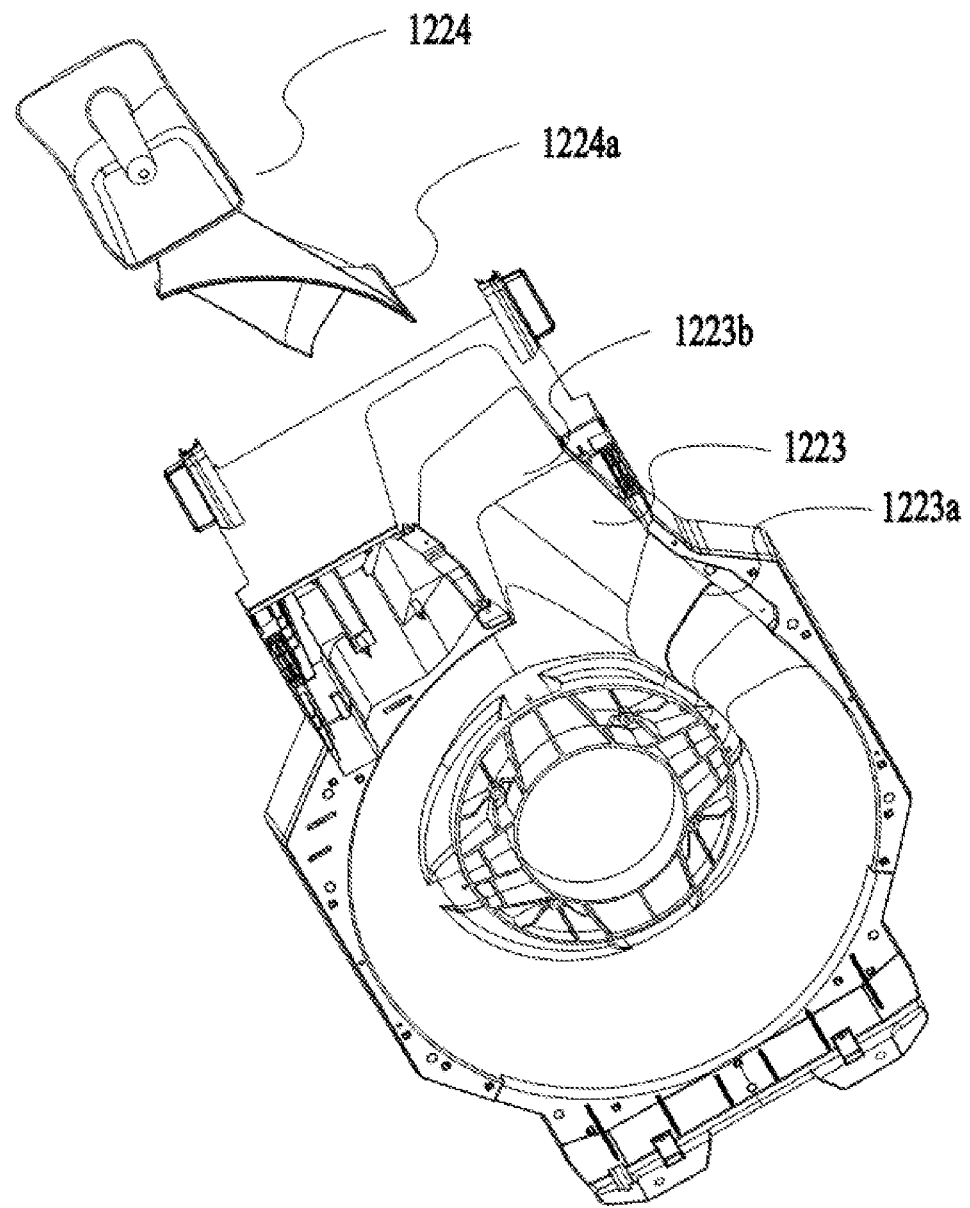
FIG. 18 depicts an exploded view of a deck and a grass cover of the body in FIG. 4.
Figure 19:
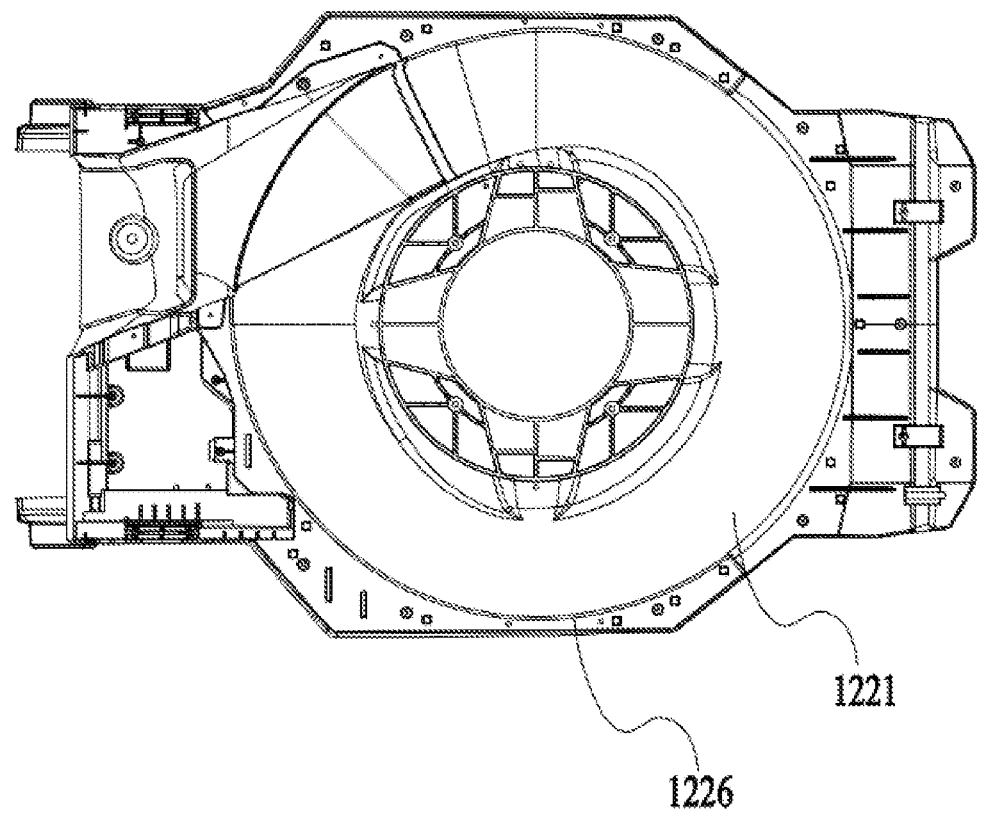
FIG. 19 depicts a bottom view of the deck and the grass cover of the body in FIG. 4.
Figure 20:
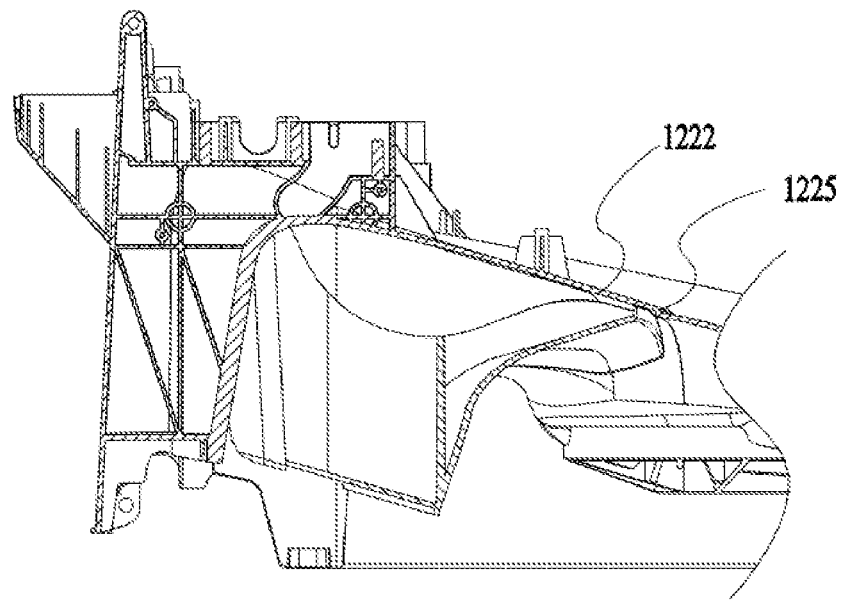
FIG. 20 depicts a partial cross-sectional view of the deck and the grass cover of the body in FIG. 4.

As shown in FIG. 17, without considering the refraction of light, the power indicator light 1237*a*, after being confined by the visible portion 1216*b*, forms a light-emitting area with the power indicator light 1237*a* as vertex, and a first boundary 1216*c* and a second boundary 1216*d* as sides. The included angle formed by the first boundary 1216*c* and the second boundary 1216*d* is greater than or equal to 90° and less than or equal to 160°. Regarding the center point of the power indicator light 1237*a* as the power indicator light 1237*a*, the visible portion 1216*b* includes a rear side closer to the rear and a front side closer to the front in the front-back direction. The first boundary 1216*c* is the line connecting the center point of the power indicator light 1237*a* and the intersection point of the rear side of the visible portion 1216*b* and the midsagittal plane; the second boundary 1216*d* is the line connecting the center point of the power indicator light 1237*a* and the intersection point of the front side of the visible portion 1216*b* and the midsagittal plane. In this example, the included angle formed by the first boundary 1216*c* and the second boundary 1216*d* is 129°, that is, the maximum visible range of the battery indicator light 1237*a* is 129° at this time. Of course, other values in the aforementioned angle range are also acceptable. Besides, the included angle between the first boundary 1216*c* and the horizontal plane is greater than or equal to 5° and less than or equal to 15°, that is, the inclination angle of the visible area of the power indicator light 1237*a* with respect to the horizontal plane is greater than or equal to 5° and less than or equal to 15°; in this example, the angle is 8°. Since the user looks obliquely down from the upper back of the power indicator light 1237*a* when operating the hand push power tool 100, in this example, the design of the battery pack 1237 and the power indicator light 1237*a* tilting backward from the vertical direction can enlarge the user's observation range of the battery indicator light 1237*a*. As shown in FIGS. 18-20, the deck 122 (refer to FIG. 1) further includes a surrounding wall 1222 configured to form a cutting space 1221 for accommodating the work component 125 (refer to FIG. 1), and the deck 122 is also formed with a grass discharge channel 1223 to discharge weeds. The grass discharge channel 1223 includes a connection end 1223*a* connected to the cutting space 1221 and a grass discharge opening 1223*b* opposite to the connection end 1223*a*. The hand push power tool 100 further includes a grass collecting device connected to the grass discharge opening 1223*b* to collect grass clippings, and a grass cover 1224 configured to block the grass discharge channel 1223 to prevent grass clippings from being discharged from the grass discharge opening 1223*b*.

The hand push power tool 100 has a collecting mode and a mulching mode. When the hand push power tool 100 is in the collecting mode, the grass discharge opening 1223*b* is open or a grass collecting device is connected. When the hand push power tool 100 is in the mulching mode, the grass cover 1224 is connected to the grass discharge channel 1223, blocking the grass discharge channel 1223 to prevent grass clippings from being discharged from the grass discharge opening 1223*b*. As shown in FIG. 18, the grass cover 1224 also includes a filling end 1224*a* extending into the grass discharge channel 1223 so that the grass discharge channel 1223 is partially filled. The filling end 1224*a* includes a filling surface configured to block the connection end 1223*a*. When the grass cover 1224 blocks the grass discharge channel 1223, the filling surface and the surrounding wall 1222 extend in a continuous curved surface.

In this example, as shown in FIGS. 18-20, a step structure 1225 is formed at the junction of the grass discharge channel 1223 and the surrounding wall 1222. When the grass cover 1224 blocks the grass discharge channel 1223, a gap of approximately 12 mm is formed between the filling end 1224*a* and the step structure 1225. When the work component 125 rotates around the axis of rotation 101 to perform cutting, the grass clippings tends to gather in the gap or adhere to the surrounding wall 1222.

When the grass cover 1224 blocks the grass discharge channel 1223, the grass cover 1224 blocks the original partial recessed structure of the deck 122. The filling surface and the surrounding wall 1222 form a revolving structure 1226 about the axis of rotation 101 (refer to FIG. 1). The revolving structure 1226 is substantially symmetrical about the axis of rotation 101. Wherein, the revolving structure 1226 is substantially symmetrical about the axis of rotation 101, when ignoring the gap formed between the inner filling end 1224*a* and the step structure 1225, the step structure 1225 formed at the junction of the grass discharge channel 1223 and the surrounding wall 1222, and the thickness of the filling end 1224*a* itself.

Figure 21:
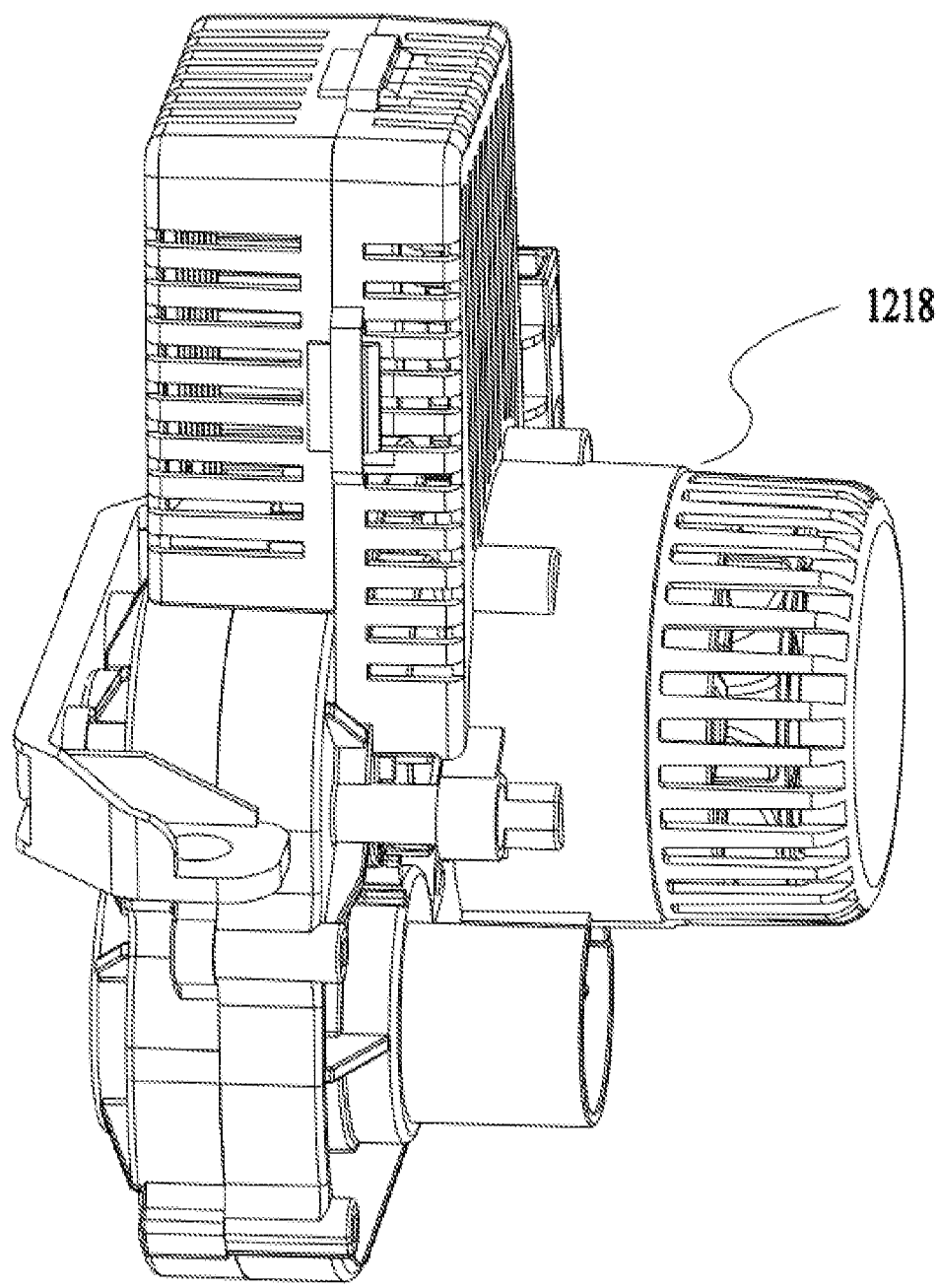
FIG. 21 depicts a perspective view of a part of the structure of the body in FIG. 4.
Figure 22:
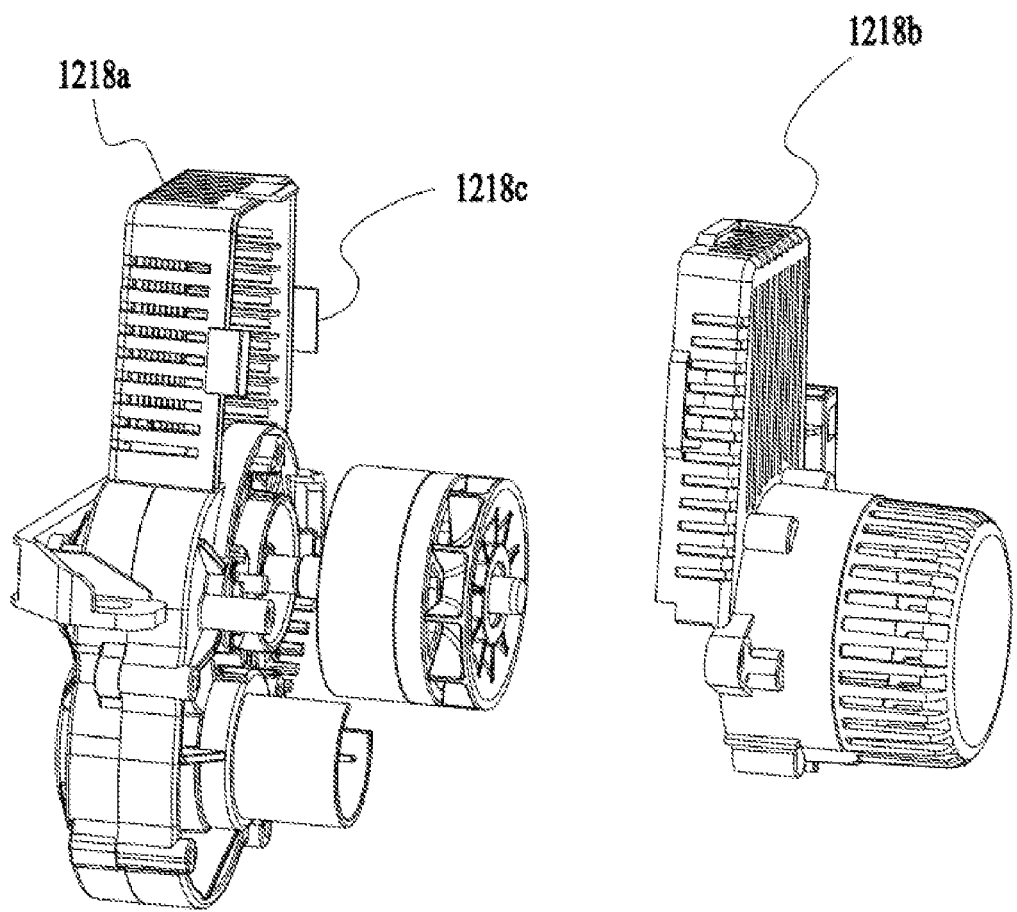
FIG. 22 depicts an exploded view of a part of the structure of the body in FIG. 4.

As shown in FIGS. 21-22, the outer rotor of the self-propelled motor configured to drive the walking wheels is also equipped with an anti-wrapping cover 1218 configured to prevent weeds from entanglement. In this example, the anti-wrapping cover 1218 is a shell structure with multiple air openings. The anti-wrapping cover 1218 is composed of a first cover part 1218*a* close to the output end of the rotor shaft of the self-propelled motor and a second cover part 1218*b* close to the input end of the rotor shaft. The first cover part 1218*a* and the second cover part 1218*b* form a detachable connection by buckle 1218*c*.

As shown in FIG. 1, FIG. 9, FIG. 10 and FIG. 23, the operating device 11 includes an operating component; the operating component includes a triggering device 114 that controls the rotation of the main motor and a self-propelled switch that controls the start and stop of the self-propelled motor. The self-propelled switch includes the first switch 112 and the second switch 113, as well as a speed regulator for adjusting the speed of the self-propelled motor, the speed regulator is specifically a speed control knob 116. The speed control knob 116, the first switch 112, and the second switch 113 are all mounted to the grip portion 1111 of the handle 111. Of course, the start and stop of the self-propelled motor can also be controlled by using just one switch. The operating device 11 also includes a signal collecting device. In this example, the signal collecting device is a signal circuit board 1238. The signal circuit board 1238 is installed inside the receiving space surrounded by the operating device 11, specifically, installed inside the receiving space surrounded by the handle 111. The triggering device 114, the first switch 112, the second switch 113, and the speed control knob 116 are all connected to the signal circuit board 1238. When the triggering device 114, the first switch 112, the second switch 113, and the speed control knob 116 are operated by the user, they can all generate electrical signals transmitted to the signal circuit board 1238. In one example, the signal collecting device may also be multiple circuit boards or other forms of electrical devices, which are not limited here. In this example, transmitting the electrical signals sent by the operating component to the same signal circuit board 1238 can simplify the internal circuit structure of the hand push power tool 100. In other examples, the operating component connected to the signal circuit board 1238 are not limited to the triggering device 114, the first switch 112, the second switch 113, and the speed control knob 116. The signal circuit board 1238 can also connect more operating components with different functions.

In one example, the signal collecting device may include multiple signal circuit boards that collect and process different signals respectively. In other examples, the signal collecting device includes a first signal circuit board connected with the triggering device 114, a second signal circuit board connected with the first switch 112 and the second switch 113, and a third signal circuit board connected with the speed control knob 116. In one example, the second signal circuit board and the third signal circuit board can be combined into one circuit board.

In an example, the hand push power tool 100 has a Bluetooth control function, the operating device 11 further includes a Bluetooth signal circuit board that receives and processes Bluetooth signals, and the Bluetooth signal circuit board is also accommodated in the receiving space formed by the operating device 11.

The operating device 11 also includes a bus connecting the body 12 and the signal collecting device. The bus is composed of one or more wires. In one example, the bus includes a signal wire 1239. The signal wire 1239 is connected with the signal circuit board 1238, the Bluetooth signal circuit board 12 and the body, and send signals from the signal circuit board 1238 or Bluetooth signal circuit board 12 to the body, wherein the transmission to the plurality of circuit boards of the body 12 can realize the control of the hand push power tool 100. Said signal wire adopts the 485 communication protocol.

Figure 23:
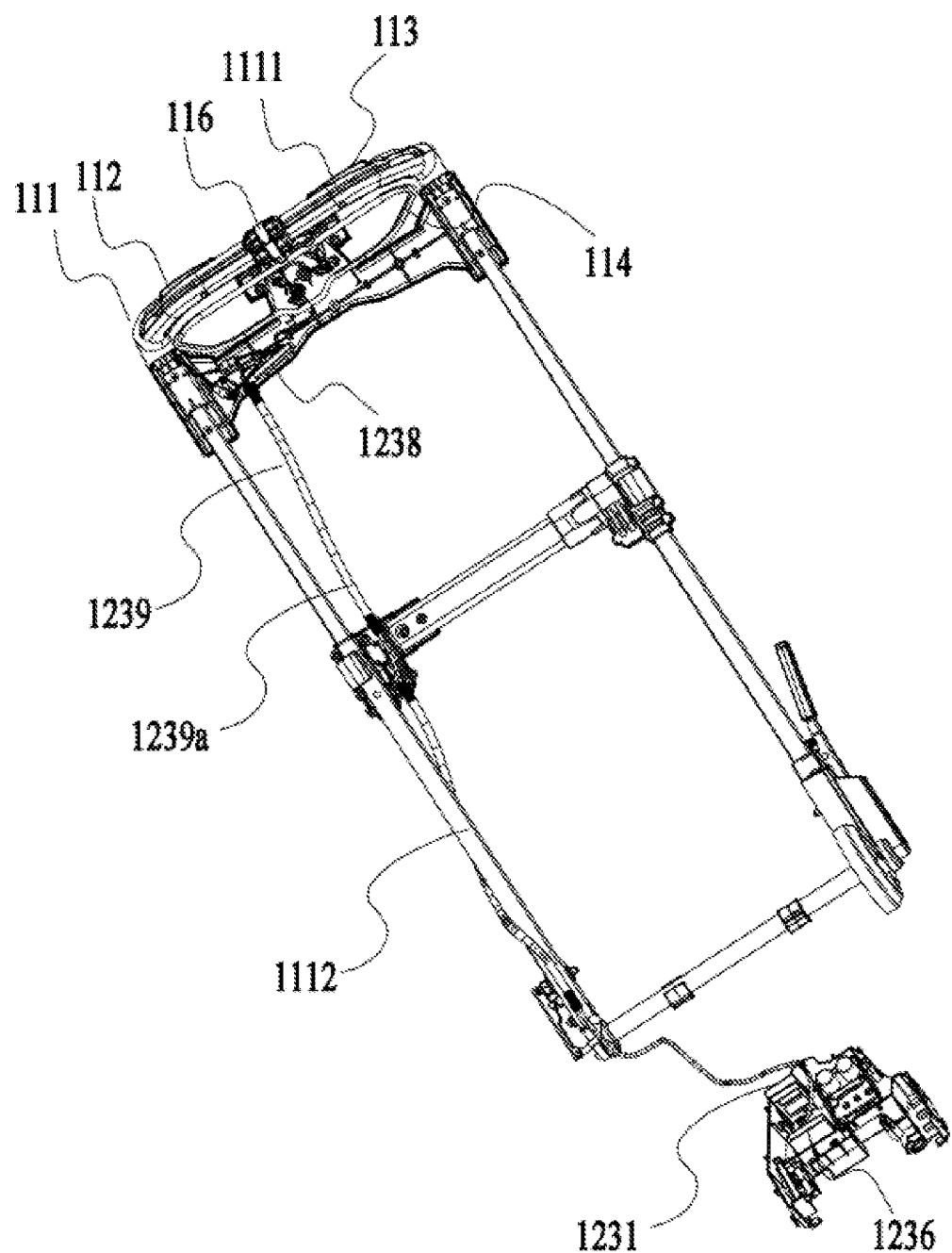
FIG. 23 depicts a perspective view of a part of the structure of the hand push power tool in FIG. 2.

As shown in FIG. 23, the signal wire 1239 includes a core wire for signal transmission and a protection tube 1239a surrounding the core wire. Specifically, the protection tube 1239a is a corrugated tube, the cross section of the protection tube 1239a is circular, and the diameter of the cross section of the protection tube 1239a is greater than or equal to 5 mm and less than or equal to 15 mm. In this example, the diameter of the cross section of the protection tube 1239a is 10 mm.

In this example, the body 12 also includes a self-propelled motor configured to drive the hand push power tool 100 to walk, and a main motor configured to drive the work component 125 to rotate about the axis of rotation. Correspondingly, the body 12 also includes a first circuit board 1231 provided with a control circuit for controlling the rotation of the main motor, and a fifth circuit board 1236 provided with a drive circuit for driving the rotation of the self-propelled motor. The first circuit board 1231 is a control circuit board. The fifth circuit board is a drive circuit board. The signal wire 1239 is connected to the first circuit board 1231 and the fifth circuit board 1236, and transmits the control signals sent by the operating components to the first circuit board 1231 and the fifth circuit board 1236, thereby controlling the start and stop of the self-propelled motor and the main motor, and further the walking of the hand push power tool 100 and the cutting of the work component 125. Among them, the signal wire 1239 is not limited to be connected to the first circuit board 1231 and the fifth circuit board 1236, but can also be connected to other circuit boards or circuit components. In this example, the body 12 also includes a functional circuit board. Functional components, such as the lighting device 124 (refer to FIG. 4) and the battery pack 1237 (refer to FIG. 16), are connected to the functional circuit board; the signal wire 1239 is also connected to the functional circuit board. All the circuit boards connected with the signal wire 1239 can send signals to the signal wire 1239 or receive signals sent to the signal wire 1239 from other circuit boards, and then selectively process the received signals.

The body 12 includes functional components such as the main motor, the self-propelled motor, the battery pack 1237, and the lighting device 124. For a hand push power tool 100 with Bluetooth function, the body 12 further comprises a Bluetooth device, the signal collecting device further comprises a fourth signal circuit board, i.e., the Bluetooth signal circuit board, the Bluetooth signal circuit board is mounted to the inner receiving space surrounded by the handle 111. The signal sent by the Bluetooth device is transmitted to the signal collecting device, received and processed by the Bluetooth signal circuit board, and transmitted to the body 12 through the signal wire 1239, so as to achieve the control of the hand push power tool 100. Wherein the Bluetooth signal circuit board can collect signals from the body 12 and the signal collecting device, and set or update multiple parameters of the body 12 and transmit them to the above-mentioned plurality of circuit boards connected with the functional components to control the plurality of functional components of the body 12. Here, it should be noted that the Bluetooth device only transmits signals to the body 12 and does not directly control the hand push power tool 100.

In this example, the signal wire 1239 extends downward from the top of the handle 111 around the connecting rod 1112, partially fixed to the connecting rod 1112, and extends into the inside of the maintenance compartment 1211, and is connected to multiple circuit boards accommodated in the maintenance compartment 1211.

In addition, the structure of the signal circuit board 1238 and the signal wire 1239 in this example can also be applied to other electric machines, such as snow blowers or string trimmers.

In this example, the hand push power tool is controlled by signal wires that collect and process various signals, thereby simplifying the control structure of the hand push power tool and making the control method more convenient and intelligent.

Figure 24:
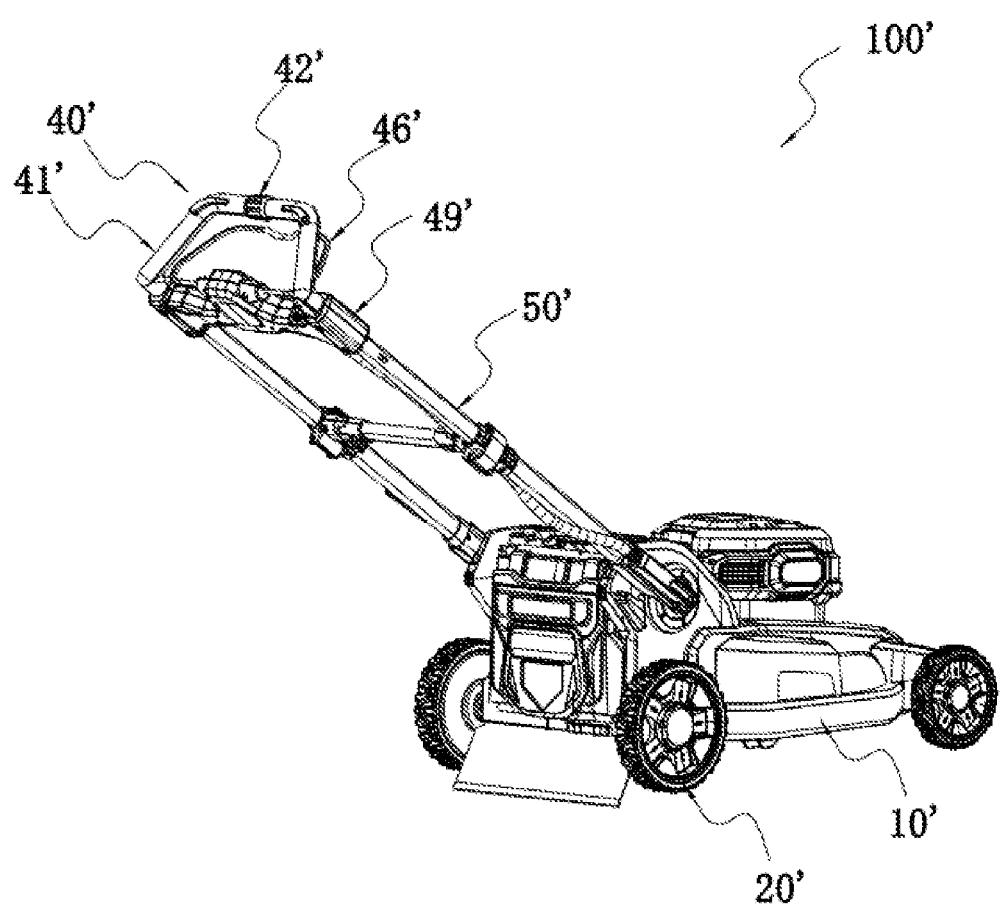
FIG. 24 depicts a schematic diagram of a hand push power tool according to an example.
Figure 25:
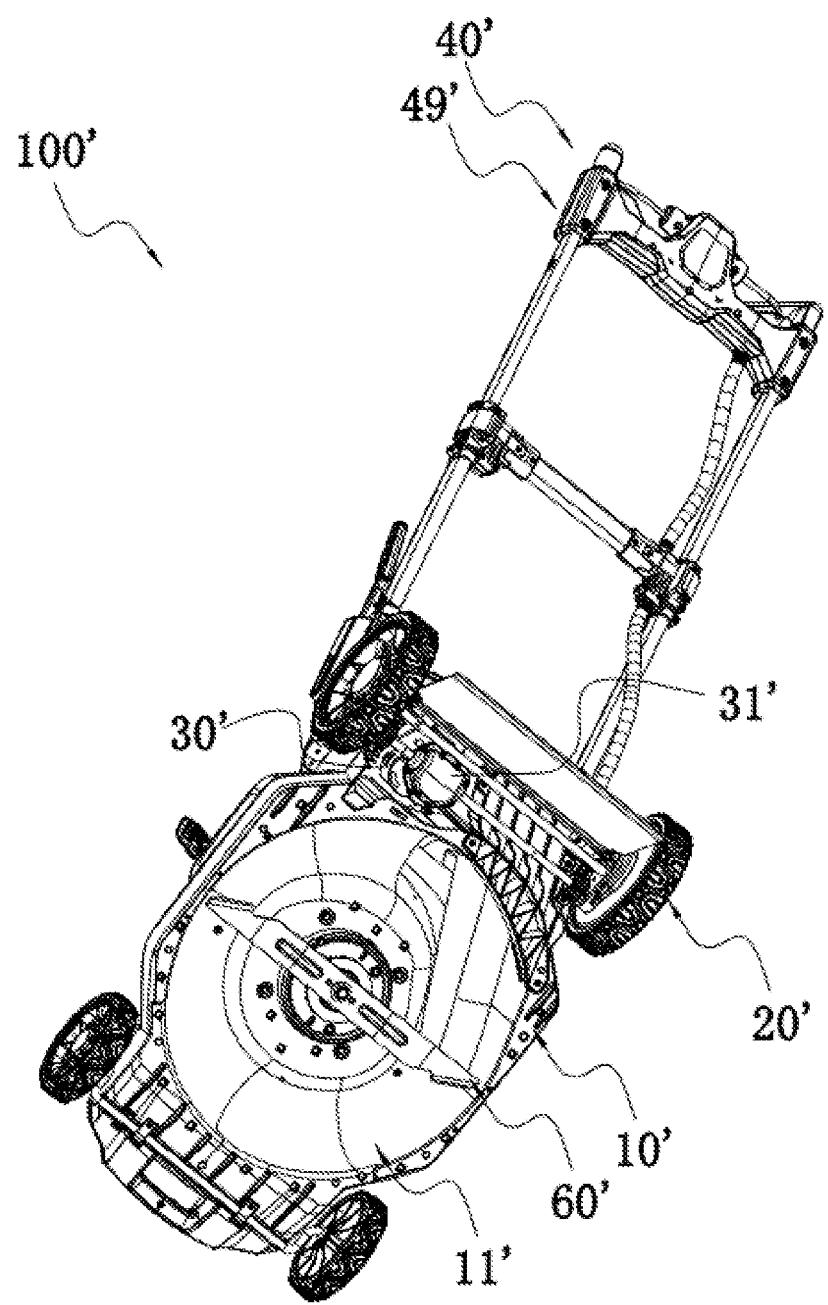
FIG. 25 depicts a schematic diagram of the hand push power tool in FIG. 24 from another perspective.

As shown in FIGS. 24 and 25, a hand push power tool 100' provided in this example includes a deck 10', wheels 20', a drive motor 30', and a control assembly 40'.

The deck 10' serves as the main support structure of the hand push power tool 100', which assembles the wheels 20', the drive motor 30' and the control assembly 40' together.

The wheels 20' are configured to the support the deck 10', the wheels 20' rotate with respect to the deck 10' so that the deck 10' moves on the ground.

The drive motor 30' is configured to drive the wheels 20' to rotate, and the drive motor 30' is mounted to the deck 10'. The hand push power tool 100' further includes a transmission mechanism 31'. The transmission mechanism 31' connects the drive motor 30' and the wheels 20'.

The control unit 40' is configured to control the hand push power tool 100'. The control assembly 40' includes a handle 41'; the user can push the hand push power tool 100' to travel by pushing the handle 41', and the handle 41' is connected to the deck 10'. The hand push power tool 100' further includes a connecting rod 50', the connecting rod 50' connecting the handle 41' and the deck 10'. In an example, the handle 41' and the connecting rod 50' can also be integrally formed, that is, the handle 41' and the connecting rod 50' are one piece. In this example, the connecting rod 50' connects the handle 41' and the deck 10'. The handle 41' is made of plastic material to facilitate moulding and connection with other parts, and the connecting rod 50' is made of metal material to ensure strength.

Figure 26:
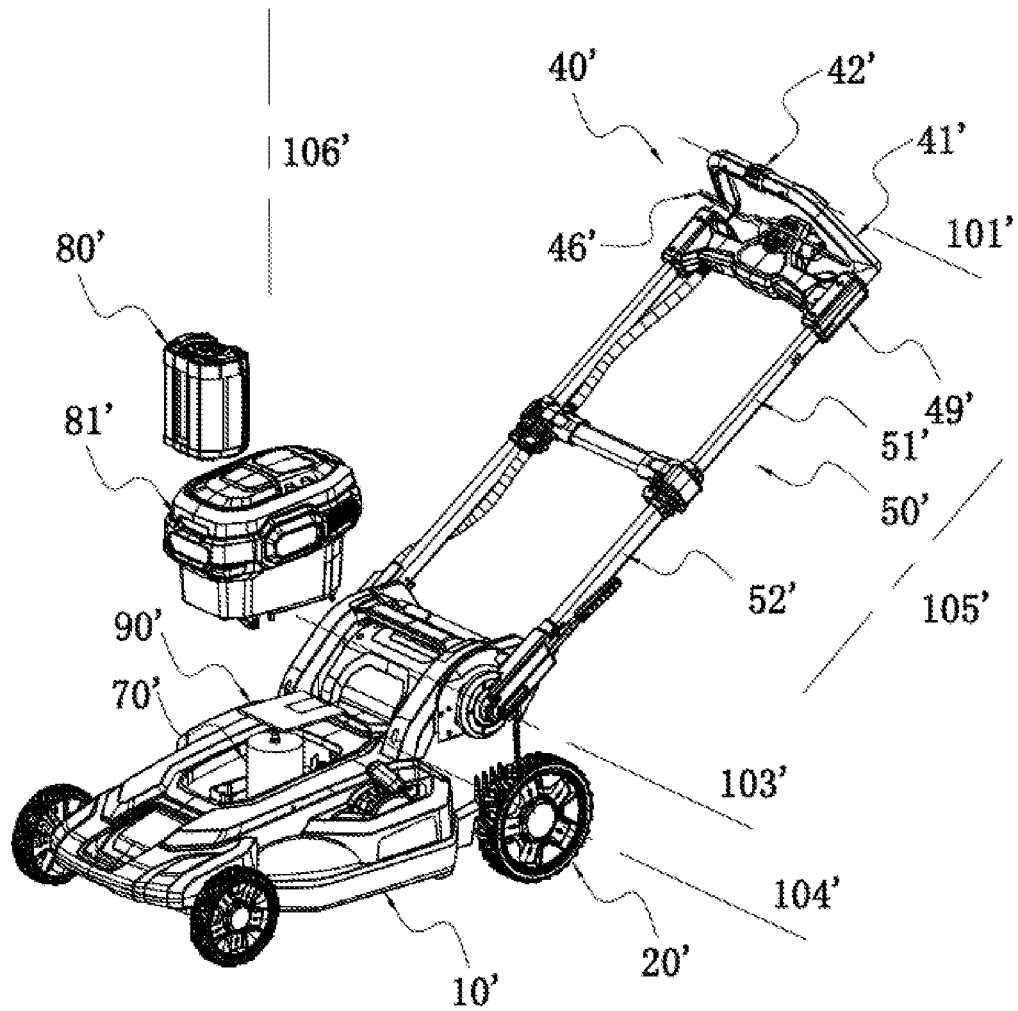
FIG. 26 depicts an exploded view of a part of the structure of the hand push power tool in FIG. 24.

As shown in FIG. 25 and FIG. 26, the hand push power tool 100' includes a work attachment 60' and a work motor 70', the work motor 70' drives the work attachment 60' to perform the function of the hand push power tool 100', the work motor 70' can be an electric motor powered by electricity or an internal combustion engine powered by fuel combustion. The deck 10' carries the work motor 70'. In one example, the work motor 70' is a motor. The hand push power tool 100' also includes a battery pack 80'; the battery pack 80' provides power for the work motor 70', and the battery pack 80' provides power for the drive motor 30'. In other examples, the work motor may not be provided, and the work attachment is driven by the drive motor.

In an example, the hand push power tool 100' shown in FIGS. 24 and 25 is a hand push power tool. The hand push power tool includes a cutting blade. The cutting blade is the work attachment 60' that realizes the mowing function. The deck 10' is provided with a cutting chamber 11'. The cutting chamber 11' accommodates the cutting blade, and the cutting blade rotates in the cutting chamber 11'.

As shown in FIGS. 27 to 31, the control assembly 40' includes a handle 41', a speed regulator 42', an electromechanical conversion device 43', a first start triggering device 44a', a second start triggering device 44b', a first start switch 45a', a second start switch 45b', a work triggering device 46', a work switch 47', a safety key 48', and a switch box 49'.

Figure 31:
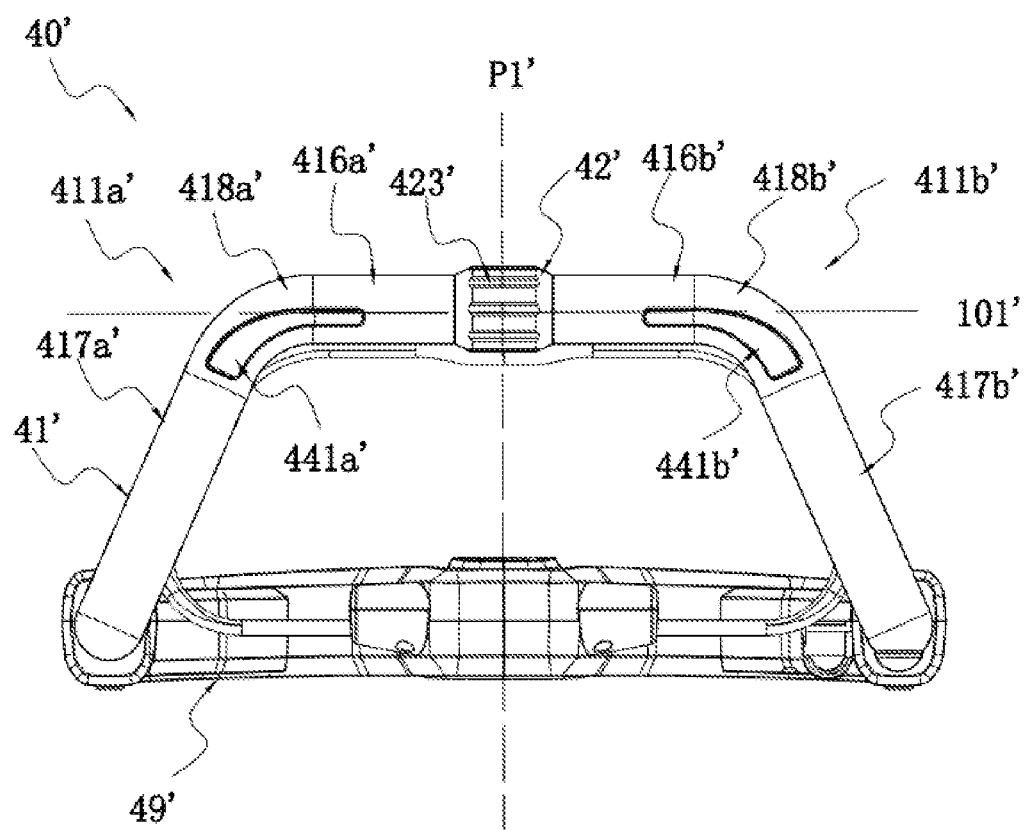
FIG. 31 depicts a schematic diagram of the control assembly in FIG. 27 from another perspective.

As shown in FIG. 31, the handle 41' is provided with a left grip portion 411a' for the user's left hand to grip and a right grip portion 411b' for the right hand to grip. The left grip portion 411a' and the right grip portion 411b' are symmetrical about a symmetry plane P1' such that the handle 41' has a symmetrical structure about the symmetry plane P1'. The handle 41' is made of plastic. The handle 41' includes a first handle housing 412' and a second handle housing 413'. The first handle housing 412' and the second handle housing 413' are provided with a cavity.

Figure 33:
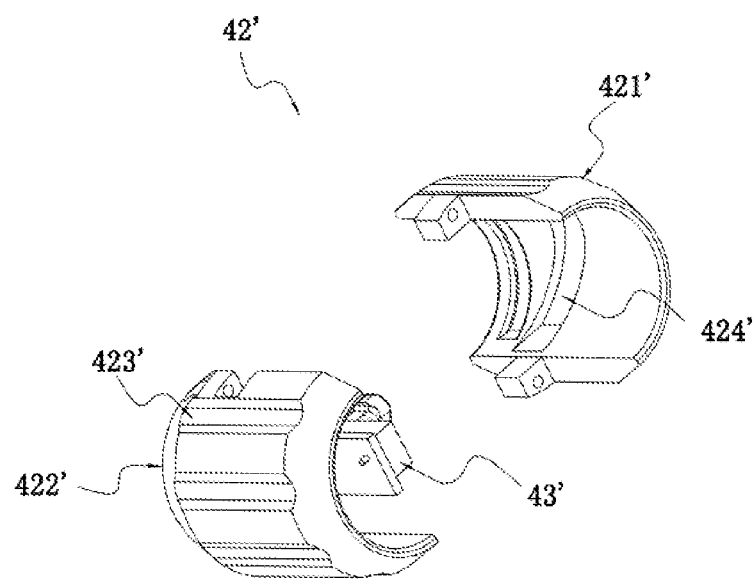
FIG. 33 depicts an exploded view of the speed regulator in FIG. 32.
Figure 34:
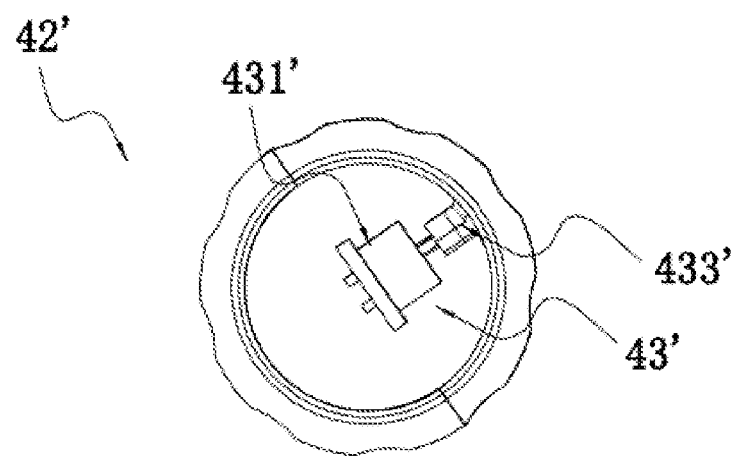
FIG. 34 depicts a schematic diagram from another view of the electromechanical conversion device and the speed regulator in FIG. 32.

The speed regulator 42' is for a user to adjust the rotational speed of the drive motor 30'. The speed regulator 42' moves with respect to the handle 41' to adjust the rotational speed of the drive motor 30'. The speed regulator 42' is provided in the middle of the handle 41', and is symmetrical about the symmetry plane P1'. The speed regulator 42' is disposed between the left 411a grip portion' and a right grip portion 411b'. While the user holds the left grip portion 411a' with the left hand, the left hand can operate the speed regulator 42'. Specifically, the user can grip the left grip portion 411a' with the palm of the left hand while operating the speed regulator 42' with the thumb of the left hand. Similarly, in the same manner as the left hand, the right hand can also simultaneously grip the right grip portion 411b' and operate the speed regulator 42', bringing operational convenience. In one example, the speed regulator 42' is rotatably connected to the handle 41'; the speed regulator 42' rotates about the central axis 101' with respect to the handle 41'. The central axis 101' is perpendicular to the symmetry plane P1', and the speed regulator 42' is an annular part. The speed regulator 42' surrounds the grip 41'; the speed regulator 42' is provided with a plurality of grooves 423' arranged in the circumferential direction of the central axis 101', the plurality of grooves 423' 101 extend along the direction of the central axis' to facilitate the user to rotate the speed regulator 42'. As shown in FIG. 33, the speed regulator 42' includes a first speed regulating housing 421' and a second speed regulating housing 422'. The handle 41' is arranged between the first speed regulating housing 421' and the second speed regulating housing 422'.

Figure 32:
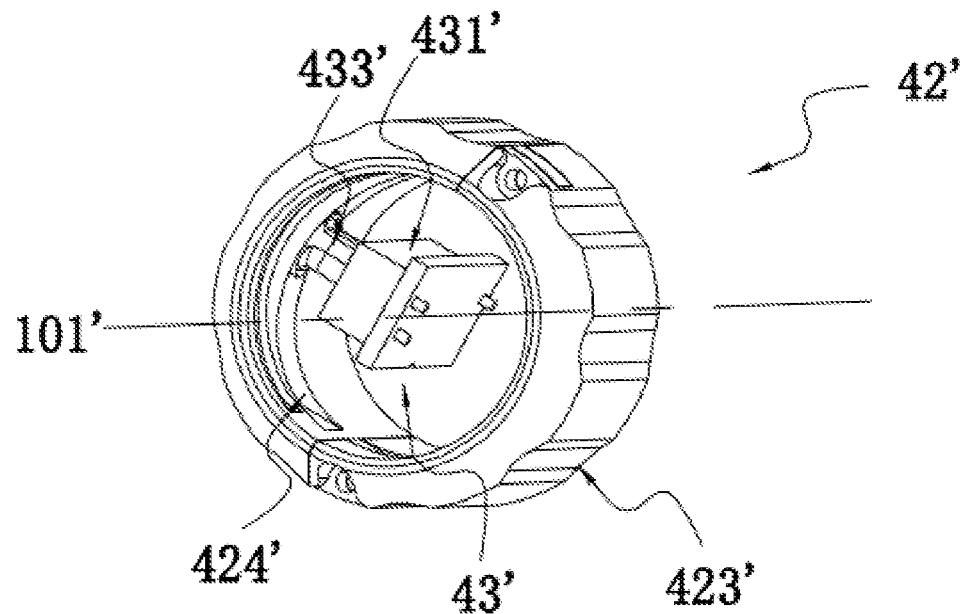
FIG. 32 depicts a schematic diagram of an electromechanical conversion device and a speed regulator of the control assembly in FIG. 27.

As shown in FIGS. 31-33, the electromechanical conversion device 43' converts the position change of the speed regulator 42' with respect to the handle 41' into electric signals. The electromechanical conversion device 43' is disposed inside the handle 41', that is, the electromechanical conversion device 43' is disposed in the cavity formed by the handle 41'.

The first start triggering device 44a' and the second start triggering device 44b' are for the user to operate to start the drive motor 30'. The user can operate the first start triggering device 44a' and the speed regulator 42' while holding the left grip portion 411a' with the left hand. Similarly, the user can operate the second start triggering device 44b' and the speed regulator 42' while holding the right grip portion 411b' with the right hand. That is, the user only needs one hand to control the two functions of start and speed regulation. In addition, no matter the user holds the left grip portion 411a' or the right grip portion 411b', the user can control the two functions of start and speed regulation.

Figure 30:
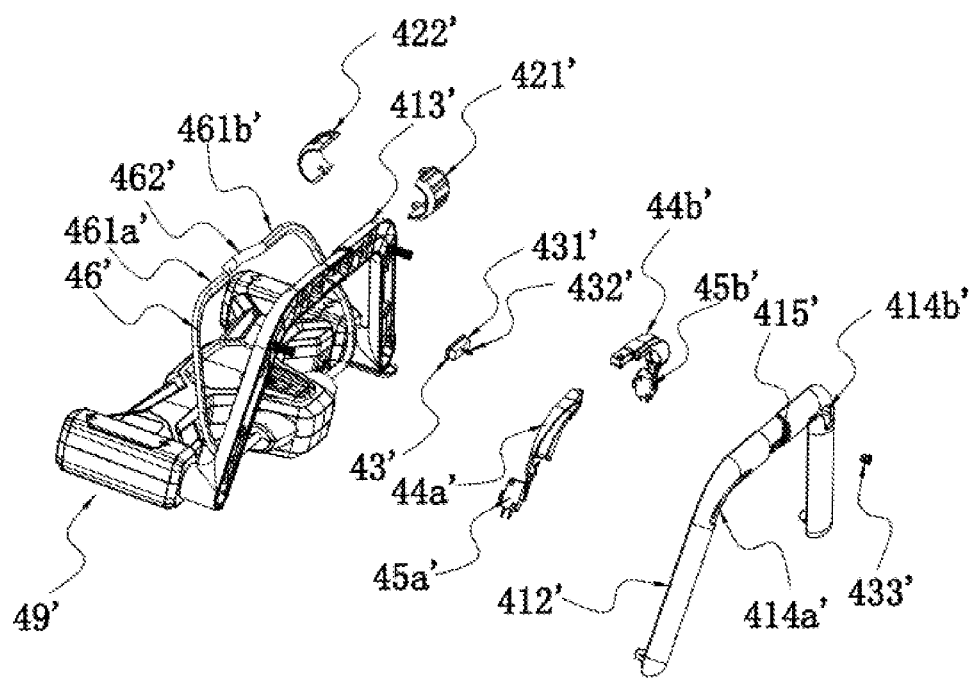
FIG. 30 depicts an exploded view of a part of the structure of the control assembly in FIG. 27.

As shown in FIG. 30, the first start switch 45a' can be controlled by the first start triggering device 44a' to start the drive motor 30'. The first start switch 45a' is electrically connected to the drive motor 30'. The second start switch 45b' can be controlled by the second start triggering device 44b' to start the drive motor 30'. The second start switch 45b' is electrically connected to the drive motor 30'. In an example, only one start switch may be provided, and both start triggering devices are configured to trigger that start switch to start the drive motor. In an example, only one start triggering device may be provided. In one example, two start triggering devices make one part or make a synchronous movement; when the user operates one start triggering device, the other start triggering device moves synchronously. In an example, two start triggering devices and one start switch may be provided, and the drive motor can only be started when both start triggering devices trigger the start switch. In one example, two start triggering devices and two start switches may be provided, one start triggering device triggers one start switch; only when both start switches are triggered can the drive motor be started, thereby preventing the user from accidentally starting the motor and improving safety; alternatively, set up one start triggering device, and one start switch or two start switches, and the drive motor is only started when the start triggering device moves back and forth twice. In addition, if two start triggering devices are provided, then after the drive motor is started, the drive motor will stop only when both start triggering devices are released; the drive motor will not stop when only one drive triggering device is released. In other examples, if two start triggering devices are provided, the drive motor will stop when any one triggering device is released; if only one start triggering device is provided, the drive motor will stop when the start triggering device is released.

As shown in FIGS. 25-30, the work triggering device 46' is set for the user operation to start the work motor 70'. The work triggering device 46' includes a first movable portion 461a' and a second movable portion 461b' for the user to operate. The first movable portion 461a' and the second movable portion 461b' move towards the handle 41' to start the work motor 70'. The work triggering device 46' rotates about a first axis 102' with respect to the handle 41'; the first axis 102' is parallel to the central axis 101'. The surface of the handle 41' concavely forms a groove, and when the work triggering device 46' rotates about the first axis 102' to be close to the handle 41', it can be embedded in the groove. At least part of the work triggering device 46' fits in the concave surface of the handle 41', which makes it easier for the user to control the work triggering device 46' to be in the triggered state while holding the handle 41', so as to keep the work motor 70' in the working state. In one example, the surface of the handle 41' may not form a groove. When the work triggering device 46' is in the triggered state, at least part of the work triggering device 46' fits the surface of the handle 41'. When the work motor 70' needs to be stopped, just release the work triggering device 46', and the work triggering device 46' will automatically restore the non-triggered state. The user operates the first start triggering device 44a', the second starting triggering device 44b', the work triggering device 46' and the speed regulator 42' while holding the handle 41', so as to facilitate the control of multiple functional components of the machine 100'.

The handle 41' rotates about a second axis 103' with respect to the deck 10' to achieve the folded storage function of the handle 41. The second axis 103' is parallel to the central axis 101'. The wheels 20' rotate about a third axis 104' with respect to the deck 10'. The third axis 104' is parallel to the central axis 101'. The connecting rod 50' includes a first connecting rod 51' and a second connecting rod 52'. The first connecting rod 51' and the second connecting rod 52' form a sliding connection; the first connecting rod 51' can slide along the direction of the first straight line 105' with respect to the second connecting rod 52'. The first straight line 105' is perpendicular to the central axis 101'. The hand push power tool 100' includes a battery compartment 81' configured to install or house a battery pack 80'. The battery pack 80' is slidably connected to the battery compartment 81' along the direction of a second straight line 106'. The second straight line 106' is perpendicular to the central axis 101'. The axis of rotation of the work attachment 60' is parallel or perpendicular to the central axis 101'.

The work switch 47' can be controlled by the work triggering device 46' to start the work motor 70'. The work switch 47' is electrically connected to the work motor 70'.

The safety key 48' can prevent the work triggering device 46' from being accidentally touched and causing the work motor 70' to start. The user needs to press the safety key 48', and then turn the work triggering device 46', the work switch 47' can then be triggered to start the work motor 70'.

The switch box 49' is provided to accommodate the work switch 47'. The work triggering device 46' is rotatably connected to the switch box 49' and can rotate about the first axis 102'. The switch box 49' includes a switch box cover 491' and a switch box seat 492'. The switch box 49' is fixed to the handle 41'; the switch box 49' fixes the connecting rod 50'; the switch box cover 491' and the switch box seat 492' clamp the connecting rod 50' from two sides.

The hand push power tool 100' also includes a circuit board assembly 90', and the circuit board assembly 90' controls the rotational speed of the drive motor 30' according to the electric signal of the electromechanical conversion device 43'. The circuit board assembly 90' is electrically connected to the drive motor 30' and the electromechanical conversion device 43'. In one example, as shown in FIG. 26, the circuit board assembly 90' is disposed on the deck 10'. In other examples, the circuit board assembly 90' may be provided in the switch box 49' or on the handle 41'.

Figure 27:
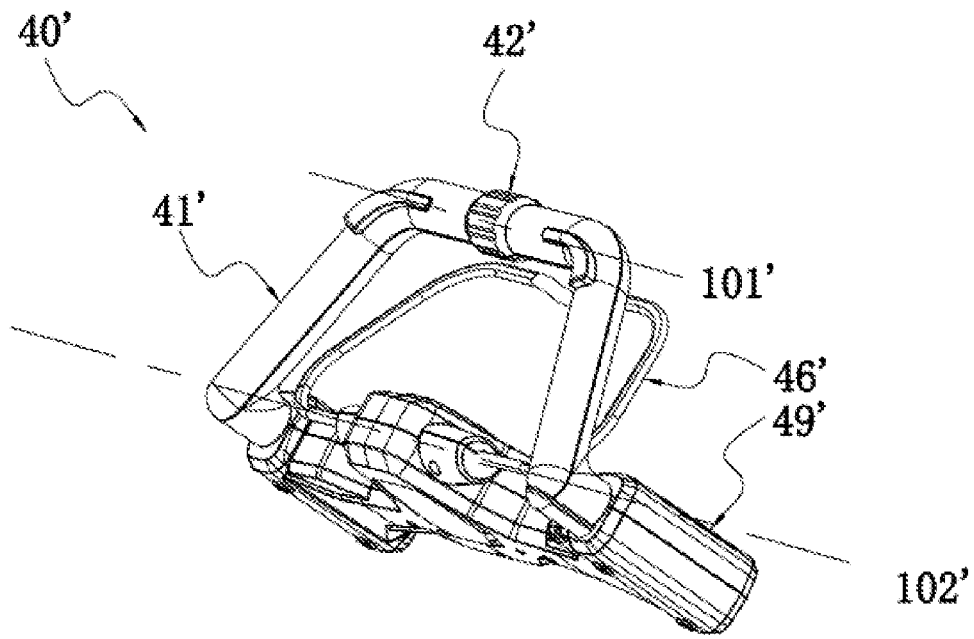
FIG. 27 depicts a schematic diagram of a control assembly of the hand push power tool in FIG. 24.
Figure 28:
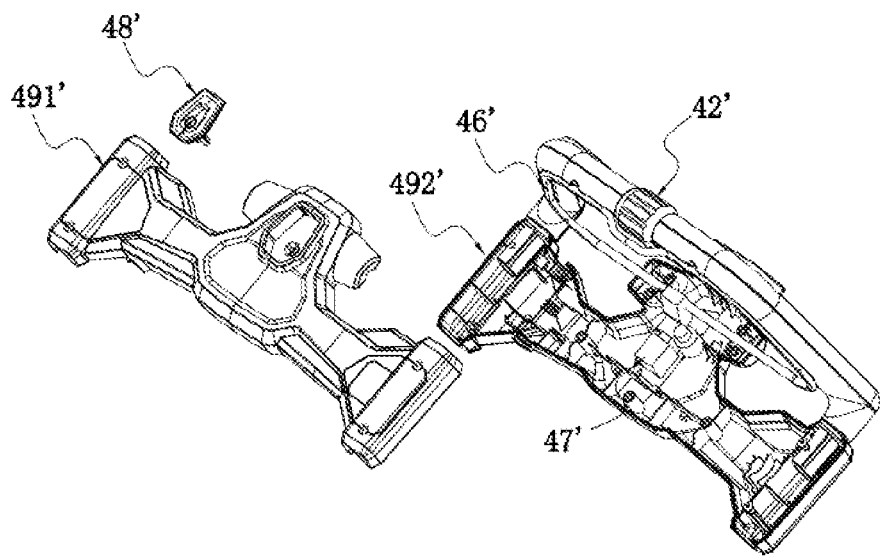
FIG. 28 depicts a schematic diagram of the internal structure of a switch box of the control assembly in FIG. 27.

In FIG. 27, the speed regulator 42' is in a first position, and in FIG. 28, the speed regulator 42' is in a second position. The speed regulator 42' can rotate with respect to the handle 41' from the first position to the second position. When the speed regulator 42' is in the first position, the circuit board assembly 90' controls the rotational speed of the drive motor 30' to be greater than the rotational speed of the drive motor 30' when the speed regulator 42' is in the second position. Wherein, the electromechanical conversion device 43' outputs different electrical signals when the speed regulator 42' is in the first position and the second position. The circuit board assembly 90' controls the drive motor 30' to rotate at different speeds according to different electrical signals of the electromechanical conversion device 43'.

As shown in FIG. 31, the left grip portion 411 a' includes a first grip portion 416a', a second grip portion 417a' and a first connecting portion 418a'; the right grip portion 411b' includes a third grip portion 416b', a fourth grip portions 417b' and a second connecting portion 418b'. The first grip portion 416a' extends along a straight line. Wherein, the first grip portion 416a' extends along the central axis 101'; the third grip portion 416b' extends along the central axis 101'. The second grip portion 417a' extends along a straight line; the fourth grip portion 417b' extends along a straight line. The second grip portion 417a' and the fourth grip portion 417b' extends in a direction obliquely intersects the central axis 101'. The first grip portion 416a' and the third grip portion 416b' are adjacent to the speed regulator 42'. The speed regulator 42' is disposed between the first grip portion 416a' and third grip portion 416b'. The first grip portion 416a' is disposed between the speed regulator 42' and the first connecting portion 418a'. The third grip portion 416b' is disposed between the speed regulator 42' and the second connecting portion 418b'. The first grip portion 416a', the second grip portion 417a', and the first connecting portion 418a' form an L-shape. The third grip portion 416b', the fourth grip portion 417b', and the second connecting portion 418b' form an L-shape.

In the extending direction of the central axis 101', the maximum size of the speed regulator 42' is larger than the maximum size of the first grip portion 416a', and the maximum size of the speed regulator 42' is larger than the maximum size of the third grip portion 416b'. The maximum size of the first grip portion 416a' is the same as the maximum size of the third grip portion 416b'. Thereby facilitating the user to use the thumb to manipulate the speed regulator 42' while holding the first grip portion 416a', the third grip portion 416b'. In the radial direction of the central axis 101', the maximum size of the first grip portion 416a' is the same as the maximum size of the third grip portion 416b'. The first grip portion 416a' and the third grip portion 416b' are symmetrical about the symmetry plane P1'.

The first start triggering device 44a' is provided on the left grip portion 411 a'; the second start triggering device 44b' is provided on the right grip portion 411b'; the first start triggering device 44a' and the second start triggering device 44b' are rotatably connected to the handle 41'.

The first start triggering device 44a' includes a first operating portion 441a' protruding from the handle 41', and the second start triggering device 44b' includes a second operating portion 441b' protruding from the handle 41'. The first operating portion 441a' can be operated by the user to activate the drive motor 30' while holding the left grip portion 411a'. The second operating portion 441b' can be operated by the user to activate the drive motor 30' while holding the right grip portion 411b'. Among them, the first operating portion 441a' and the second operating portion 441b' protrude backward from the handle 41'. The first operating portion 441a' can be operated by the user to move forward to activate the drive motor 30' while holding the left grip portion 411a', and the second operating portion 441b' can be operated by the user to move forward to activate the drive motor 30' while holding the right grip portion 411b'. When the first start triggering device 44a' or the second start triggering device 44b' is activated, the drive motor 30' drives the hand push power tool 100' to move forward. When the user grips the left grip portion 411a' and the right grip portion 411b', pushing the handle 41' forward can start the drive motor 30'. When the user needs to manually pull the hand push power tool 100' to move backward, the first start triggering device 44a' and the second start triggering device 44b' need to be released to turn off the drive motor 30'. The user can loosen the grip of the handle 41' and pull the handle 41' backward. At this time, the first start triggering device 44a' and the second start triggering device 44b' are not subjected to force from the hand, and can be released. This avoids the situation that when the first start triggering device 44a' and the second start triggering device 44b' are arranged in front of the handle 41', the first start triggering device 44a' and the second start triggering device 44b' still receive the force from the hand when the handle 41' is pulled back, and thus the first starting triggering device 44a' and the second starting triggering device 44b' are still in the on state, that is, the drive motor 30' is not stopped, which makes it is difficult for the user to pull the machine backward. In one example, the maximum distance from any point on the first start triggering device 44a' and the second start triggering device 44b' to the handle 41' is less than or equal to 20 mm. Thereby facilitating the user to release the first start triggering device 44a' and the second start triggering device 44b' when the handle 41' is pulled backwards while loosening the grip of the left grip portion 411a' and the right grip portion 411b'.

Figure 29:
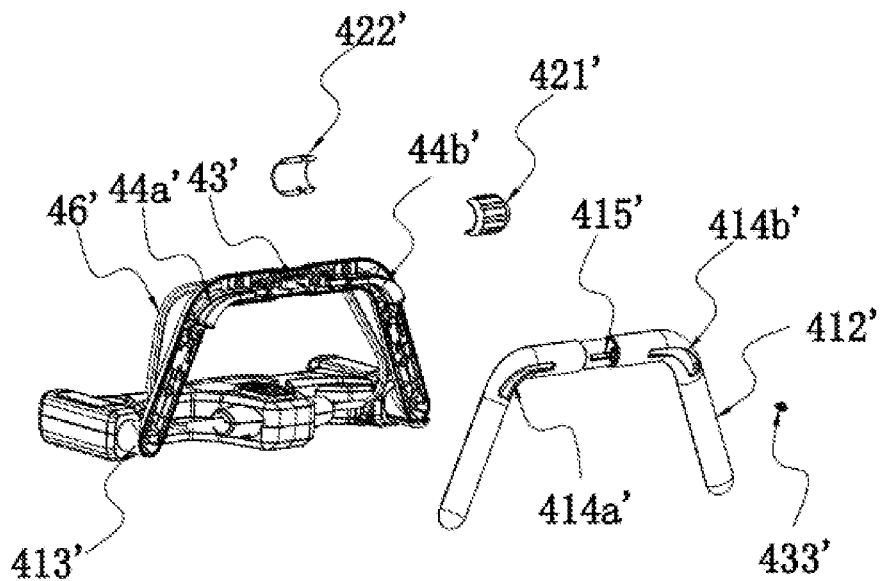
FIG. 29 depicts a schematic diagram of the internal structure of a handle of the control assembly in FIG. 27.

As shown in FIGS. 29 and 30, the first start triggering device 44a' is disposed on the first grip portion 416a' and the first connecting portion 418a', and the second start triggering device 44b' is disposed on the third grip portion 416b' and the second connection portion 418b'. Specifically, one end of the first operating portion 441a' is provided on the first grip portion 416a'; the other end of the first operating portion 441a' is provided on the first connecting portion 418a'. One end of the second operating portion 441b' is provided on the third grip portion 416b'; the other end of the second operating portion 441b' is provided on the second connecting portion 418b'. When the user holds the first grip portion 416a', the first start triggering device 44a' can be controlled with the palm, that is, the first start triggering device 44a' can be triggered while the user is holding the first grip portion 416a', thereby making the hand push power tool 100' in a self-propelled state. The operation is convenient and quick. Similarly, when the user holds the third grip portion 416b', the second start triggering device 44b' can be controlled with the palm. The first start triggering device 44a' is not located on the second grip portion 417a'; and the second start triggering device 44b' is not located on the fourth grip portion 417b'. When the user holds the second grip portion 417a' and the fourth grip portion 417b', the first start triggering device 44a' and the second start triggering device 44b' will not be triggered just because the user is holding the second grip portion 417a' and the fourth grip portion 417b', and thus the hand push power tool 100' will not be in the self-propelled state. When the user does not need to use the self-propelled function, the user can hold the second grip portion 417a' and the fourth grip portion 417b' to operate. When the user holds the second grip portion 417a' and the fourth grip portion 417b', the user may control the first start triggering device 44a' and the second start triggering device 44b' with the thumb to make the hand push power tool 100' enter the self-propelled state.

The work triggering device 46' includes a first movable portion 461a' operated by the user's left hand and a second movable portion 461b' operated by the user's right hand. The first movable portion 461a' and the second movable portion 461b' are arranged in front of the handle 41'. The user operates the first movable portion 461a' and the second movable portion 461b' to move backward to start the work motor 70'. The left grip portion 411a', the first movable portion 461a', and the first operating portion 441a' can be held by the user with one hand. Similarly, the right grip portion 411b', the second movable portion 461b', and the second operating portion 441b' can be held by the user with one hand. The first movable portion 461a' and the second movable portion 461b' extend along a straight line. The work triggering device also includes an intermediate portion 462' connecting the first movable portion 461a' and the second movable portion 461b', and the intermediate portion 462' deviates from the extending line of the first movable portion 461a' and the second movable portion 461b'. The handle 41' is formed with a receiving groove, and the receiving groove can accommodate the first movable portion 461a' and the second movable portion 461b'. When the work triggering device 46' is triggered by the user, the first movable portion 461a' and the second movable portion 461b' is located in the receiving groove, thereby facilitating the user in holding the left grip portion 411a' and the right grip portion 411b'.

The first start triggering device 44a' is configured to trigger the first start switch 45a', and the second start triggering device 44b' is configured to trigger the second start switch 45b'. The handle 41' is provided with a first throughole 414a' and a second throughole 414b'. The first start triggering device 44a' passes through the first throughole 414a' to protrude from the handle 41', and the second start triggering device 44b' passes through the second throughole 414b' to protrude from the handle 41'. In an example, the first handle housing 412' is formed with a first throughole 414a' and a second throughole 414b'. The first start triggering device 44*a*' and the second start triggering device 44*b*' are symmetrical about the symmetry plane P1'. The first start switch 45*a*' and the second start switch 45*b*' are provided inside the handle 41'. The first start switch 45*a*' and the second start switch 45*b*' are symmetrical about the symmetry plane P1'.

The electromechanical conversion device 43' is arranged in the handle 41'. The electromechanical conversion device 43' is located between the left grip portion 411*a*' and the right grip portion 411*b*'. The electromechanical conversion device 43' and the speed regulator 42' have corresponding positions. The position of the electromechanical conversion device 43' improves reasonable space usage inside the handle 41'. The correspondence of the position of the electromechanical conversion device 43' and the position of the speed regulator 42' simplifies the structure.

In one example, the electromechanical conversion device 43' is a slide rheostat. A potentiometer is a slide rheostat, and the electromechanical conversion device 43' may be a potentiometer.

As shown in FIGS. 30-34, the slide rheostat comprises a body 431' and a slider 432' that slides with respect to the body 431'. The slide rheostat outputs different electrical signals when the slider 432' is in different positions with respect to the body 431'. The movement of the speed regulator 42' drives the slider 432' to move with respect to the body 431'. More specifically, the speed regulator 42' rotates with respect to the handle 41' to drive the slider 432' to slide with respect to the body 431'. The slider 432' slides with respect to the body 431' in a direction parallel to the central axis 101'.

As shown in FIGS. 30 and 32-34, the speed regulator 42' is formed with a chute 424' tilted from the central axis 101', and the chute 424' engages with the slider 432'. The hand push power tool 100' also includes a connecting piece 433', the connecting piece 433' is fixed to the slider 432', and the connecting piece 433' passes through an elongated hole 415' and extends into the chute 424' of the speed regulator 42' to realise the engagement of the chute 424' and the slide 432'.

When the speed regulator 42' rotates with respect to the handle 41', the chute 424' moves with respect to the slider 432'. The chute 424' guides the slider 432' to slide in a direction parallel to the central axis 101' with respect to the body 431'. The handle 41' is formed with an elongated hole 415'; wherein the elongated hole 415' extends in a direction parallel to the central axis 101'. The elongated hole 415' guides the slider 432' to slide in a direction parallel to the central axis 101' with respect to the body 431'. The first throughhole 414*a*', the second throughhole 414*b*' and the elongated hole 415' are located on the same side of the handle 41'. The first throughhole 414*a*', the second throughhole 414*b*' and the elongated hole 415' are provided on the first handle housing 412'.

Compared with the slider 432' sliding along a direction perpendicular to the central axis 101', the slider 432' sliding along the direction of the central axis 101' does not require the handle 41' to be provided with a relatively long opening along the direction perpendicular to the central axis 101', which increases the strength of the handle 41'. The speed regulator 42' is rotatably connected with the handle 41'. Compared with the structure of the speed regulator 42' slidably connected to the handle, the structure of the regulating member 42' rotatably connected to the handle 41' is convenient in that it facilitates the user to operate with either one hand, with the same operation.

Figure 35:
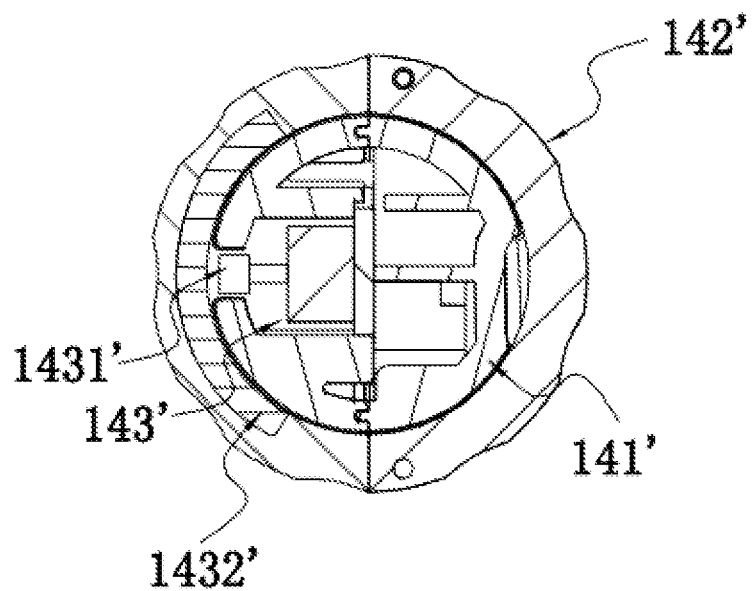
FIG. 35 depicts a schematic diagram of an electromechanical conversion device, a speed regulator and a handle.

In one example, the electromechanical conversion device is a sensor; the sensor detects the position of the speed regulator 142' with respect to the handle 141'. The electromechanical conversion device is a Hall sensor 143', and the Hall sensor 143' detects the position of the speed regulator 142' with respect to the handle 141' as shown in FIG. 35. The Hall sensor 143' includes a Hall element 1431' and a magnetic part 1432'. The magnetic part 1432' is fixed to the speed regulator 142', and the Hall element 1431' is fixed to the handle 141'. When the speed regulator 142' moves with respect to the handle 141', the magnetic part 1432' moves with respect to the Hall element 1431'. When the magnetic part 1432' reaches different positions with respect to the Hall element 1431', the Hall sensor 143' outputs different electrical signals. The speed regulator 142' rotates with respect to the handle 141' to drive the magnetic part 1432' to rotate with respect to the Hall element 1431'.

Figure 36:
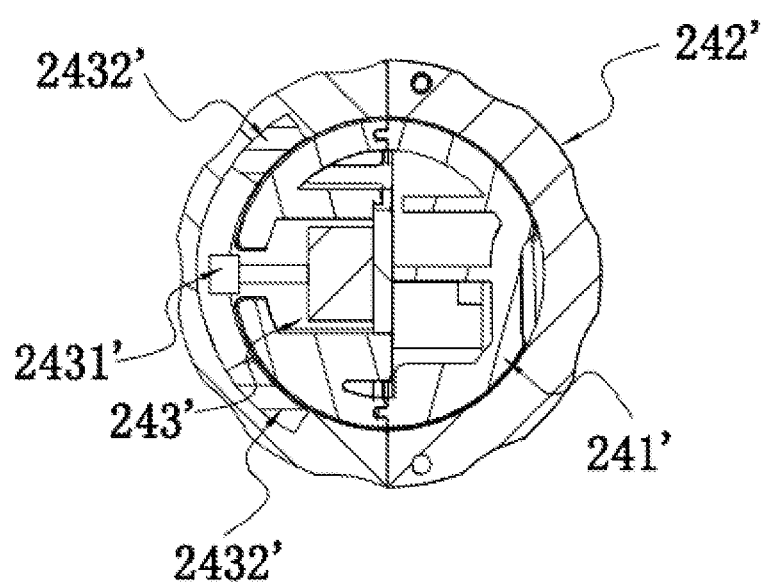
FIG. 36 depicts another schematic diagram of an electromechanical conversion device, a speed regulator and a handle.

In one example, as shown in FIG. 36, the electromechanical conversion device is a Hall sensor 234', and the Hall sensor 234' detects the position of the speed regulator 242' with respect to the handle 241'. The Hall sensor includes a Hall element 2431' and two magnetic parts 2432', and the two magnetic parts 2432' are fixed to the speed regulator 242'. In an example, the magnetic directions of the two magnetic parts 2432' are opposite, and the Hall element 2431' is fixed to the handle 241'. Wherein the Hall element 2431' extends outside the handle 241' and is located between the two magnetic parts 2432'. When the speed regulator 242' moves with respect to the handle 241', the magnetic part 2432' moves with respect to the Hall element 2431'. When the magnetic part 2432' reaches different positions with respect to the Hall element 2431', the Hall sensor 234' outputs different electrical signals. The speed regulator 242' rotates with respect to the handle 241' to drive the magnetic part 2432' to rotate with respect to the Hall element 2431'.

In an example, the electromechanical conversion device may be a touch screen, and the user's finger slides on the touch screen to output different electrical signals to control the rotational speed of the drive motor.

In an example, the electromechanical conversion device may be a slide bar. The user's finger slides from the rear to the front of the slide bar once to increase the speed of the drive motor by one gear, and the speed of the drive motor increases; the user's finger slides from the front to the rear of the slide bar once to reduce the speed of the drive motor by one gear, and the speed of the drive motor reduces.

Figure 37:
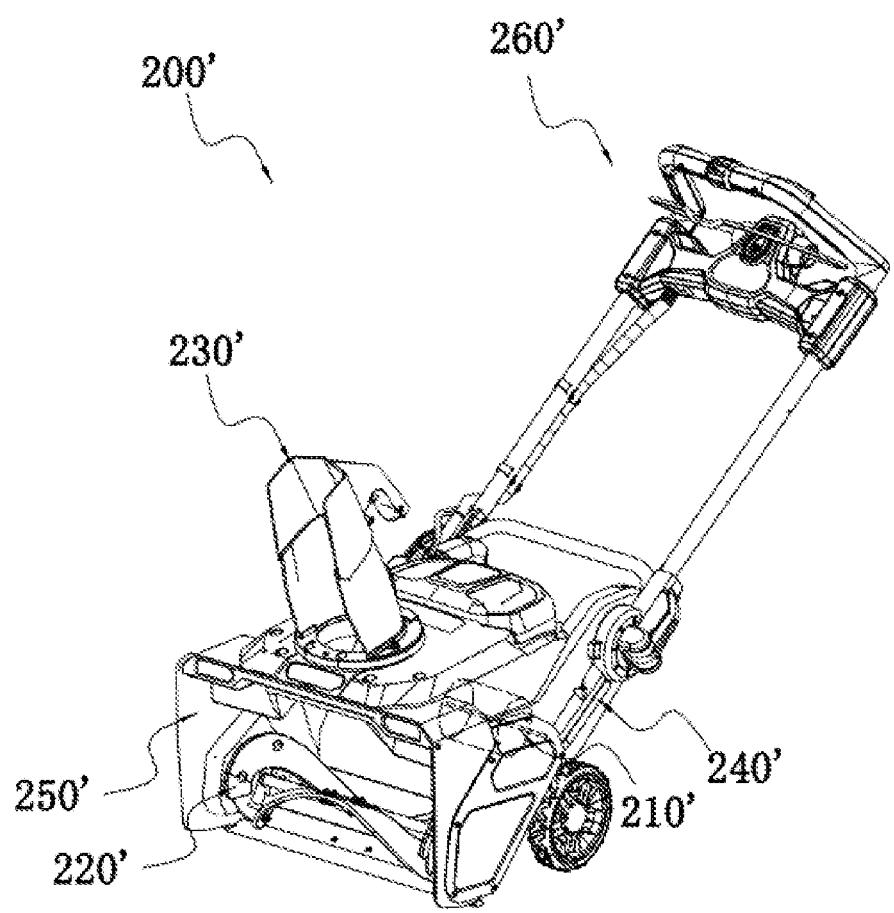
FIG. 37 depicts a schematic diagram of another hand push power tool.

In one example, as shown in FIG. 37, the hand push power tool 200' is a snow blower. The snow blower includes a work motor 210', a snow auger 220', a snow thrower 230' and a deck 240'. The snow auger 220' is used as the work attachment to realize the function of snow sweeping. The snow thrower 230' is configured to guide the movement of the snow. The work motor 210' drives the snow blower to rotate and drives the snow to be thrown from the snow thrower 230'. The deck 240' is formed with a cavity 250'. The snow auger 220' rotates in the cavity 250'. Compared to the hand push power tool shown in FIG. 24, the snow blower shown in FIG. 37 can adopt the same method of controlling self-propelling and the same structure for realizing self-propelling. Wherein, the control assembly 260' of the snow blower shown in FIG. 37 is the same as the control assembly 40' of the hand push power tool shown in FIG. 24.

What is claimed is:
1. A hand push lawn mower, comprising:
   a body comprising a cutting blade, a deck, a motor coupled to drive the cutting blade to rotate, a height adjustment assembly coupled to the deck to selectively move the deck up and down, and a grass baffle located to prevent grass clippings from splashing towards a back of the hand push lawn mower;

the body further comprises a walking assembly including walking wheels and a first drive shaft to drive the walking wheels to rotate, the grass baffle is mounted to a second drive shaft rotatable with respect to the first drive shaft, when the height adjustment assembly adjusts the height of the deck, a displacement of the grass baffle in a vertical direction is less than a displacement of the deck in the vertical direction.

2. The hand push lawn mower of claim 1, when the height adjustment assembly adjusts the height of the deck, the displacement of the grass baffle in the vertical direction is less than half of the displacement of the deck in the vertical direction.

3. The hand push lawn mower of claim 1, the height adjustment assembly comprises the second drive shaft for driving the deck to move, an adjustment handle for a user to operate, and a link mechanism connecting the adjustment handle and the second drive shaft.

4. The hand push lawn mower of claim 3, wherein the second drive shaft is parallel to the first drive shaft.

5. The hand push lawn mower of claim 4, wherein the height adjustment assembly further comprises a connecting piece that is rotatably connected to the walking wheels, and the connecting piece forms a rotatable connection with the first drive shaft and a fixed connection with the second drive shaft.

6. The hand push lawn mower of claim 5, wherein a ratio of a distance from the first drive shaft to a center of the walking wheels to a distance of the second drive shaft to the center of the walking wheels is about 1.52.

7. The hand push lawn mower of claim 5, wherein a distance from the first drive shaft to a center of the walking wheels is greater than a distance of the second drive shaft to the center of the walking wheels.

8. The hand push lawn mower of claim 3, wherein the second drive shaft is eccentrically arranged with respect to an axis of rotation of the walking wheels.

9. A hand push lawn mower, comprising:
a body comprising a cutting blade, a deck, a motor coupled to drive the cutting blade to rotate, a height adjustment assembly to adjust the deck to move up and down, and a grass baffle mounted to prevent grass clippings from splashing towards a back of the hand push lawn mower;

when the height adjustment assembly adjusts the height of the deck, a position of the grass baffle remains substantially unchanged in a vertical direction.

10. The hand push lawn mower of claim 9, the body further comprises a walking assembly comprising walking wheels and a first drive shaft for driving the walking wheels to rotate, and the grass baffle is mounted to the first drive shaft.

11. The hand push lawn mower of claim 10, wherein a position where the grass baffle is connected to the body and a position of a center of the walking wheels is infinitely close or even overlapped.

12. A hand push lawn mower, comprising:
a body comprising a cutting blade, a deck, a motor coupled to drive the cutting blade to rotate, a walking assembly comprising walking wheels and a first drive shaft for driving the walking wheels to rotate, a height adjustment assembly coupled to the deck to selectively move the deck up and down, and a grass baffle to prevent grass clippings from splashing towards a back of the hand push lawn mower;

the height adjustment assembly comprises a second drive shaft which is rotatable relative to the first drive shaft for driving the deck to move, an adjustment handle for a user to operate, and a link mechanism connecting the adjustment handle and the second drive shaft, and the grass baffle is mounted to the second drive shaft.

13. The hand push lawn mower of claim 12, wherein the second drive shaft is parallel to the first drive shaft.

14. The hand push lawn mower of claim 13, wherein the height adjustment assembly further comprises a connecting piece that is rotatably connected to the walking wheels and the connecting piece forms a rotatable connection with the first drive shaft and a fixed connection with the second drive shaft.

15. The hand push lawn mower of claim 14, wherein a ratio of a distance from the first drive shaft to a center of the walking wheels to a distance of the second drive shaft to the center of the walking wheels is about 1.52.

16. The hand push lawn mower of claim 14, wherein a distance from the first drive shaft to a center of the walking wheels is greater than a distance of the second drive shaft to the center of the walking wheels.

17. The hand push lawn mower of claim 12, wherein the second drive shaft is eccentrically arranged with respect to an axis of rotation of the walking wheels.

* * * * *

UNITED STATES PATENT AND TRADEMARK OFFICE
CERTIFICATE OF CORRECTION

| | | |
|---|---|---|
| PATENT NO. | : 11,997,945 B2 | |
| APPLICATION NO. | : 17/134670 | |
| DATED | : June 4, 2024 | |
| INVENTOR(S) | : Fangjie Nie et al. | |

It is certified that error appears in the above-identified patent and that said Letters Patent is hereby corrected as shown below:

On the Title Page

Column 1 insert Item [30]:
--Foreign Application Priority Data
June 29, 2018 (CN) ................ 201810695890--

Signed and Sealed this
Twenty-ninth Day of October, 2024

Katherine Kelly Vidal
*Director of the United States Patent and Trademark Office*